United States Patent
Lee et al.

(10) Patent No.: US 12,530,161 B2
(45) Date of Patent: Jan. 20, 2026

(54) DISPLAY DEVICE AND CONTROL METHOD THEREOF

(71) Applicant: LG ELECTRONICS INC., Seoul (KR)

(72) Inventors: Jinhee Lee, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/704,392

(22) PCT Filed: Nov. 2, 2021

(86) PCT No.: PCT/KR2021/015665
§ 371 (c)(1),
(2) Date: Apr. 24, 2024

(87) PCT Pub. No.: WO2023/080264
PCT Pub. Date: May 11, 2023

(65) Prior Publication Data
US 2024/0419381 A1    Dec. 19, 2024

(51) Int. Cl.
*G06F 3/14* (2006.01)
*G06F 3/16* (2006.01)

(52) U.S. Cl.
CPC . *G06F 3/14* (2013.01); *G06F 3/16* (2013.01)

(58) Field of Classification Search
CPC .......... G06F 3/16; G06F 3/165; G06F 1/1652; G09G 2380/02; G09G 3/035; G09F 9/301; H04N 5/60
See application file for complete search history.

(56) References Cited

U.S. PATENT DOCUMENTS

2019/0064883 A1\* 2/2019 Hong ................. H04N 21/4222
2019/0146557 A1    5/2019 Choi et al.
2019/0166327 A1    5/2019 Kim et al.
(Continued)

FOREIGN PATENT DOCUMENTS

| JP | 2005-215320 | 8/2005 |
|---|---|---|
| KR | 10-2011-0005205 | 1/2011 |
| KR | 10-2017-0043347 | 4/2017 |

(Continued)

OTHER PUBLICATIONS

PCT International Application No. PCT/KR2021/015665, International Search Report dated Jul. 22, 2022, 4 pages.
(Continued)

*Primary Examiner* — Priyank J Shah
(74) *Attorney, Agent, or Firm* — LEE, HONG, DEGERMAN, KANG & WAIMEY

(57) ABSTRACT

Provided in an embodiment of the present disclosure is a display device comprising: a display including a display area in which a content is output; a sound output unit which outputs a sound; a motor which controls a cover to expose a part of the display area to the outside; and a control unit which controls the display, the sound output unit, and the motor, wherein, while the motor controls the cover to expose a part of the display area to the outside, the control unit controls the level of a sound output by the sound output unit, on the basis of a position of the cover relative to the display.

12 Claims, 19 Drawing Sheets

(56) References Cited

U.S. PATENT DOCUMENTS

2023/0213978 A1\* 7/2023 Kim .................. H04M 1/72448
  455/566
2023/0308532 A1\* 9/2023 Kim ......................... G06F 3/14

FOREIGN PATENT DOCUMENTS

| KR | 10-2017-0060519 | 6/2017 |
| KR | 10-2019-0022157 | 3/2019 |
| KR | 10-2020-0139629 | 12/2020 |
| KR | 10-2021-0033696 | 3/2021 |

OTHER PUBLICATIONS

Korean Intellectual Property Office Application No. 10-2024-7013047, Office Action dated Sep. 30, 2025, 6 pages.
European Patent Office Application Serial No. 21963364.1, Search Report dated Jul. 30, 2025, 13 pages.

\* cited by examiner

FIG. 6
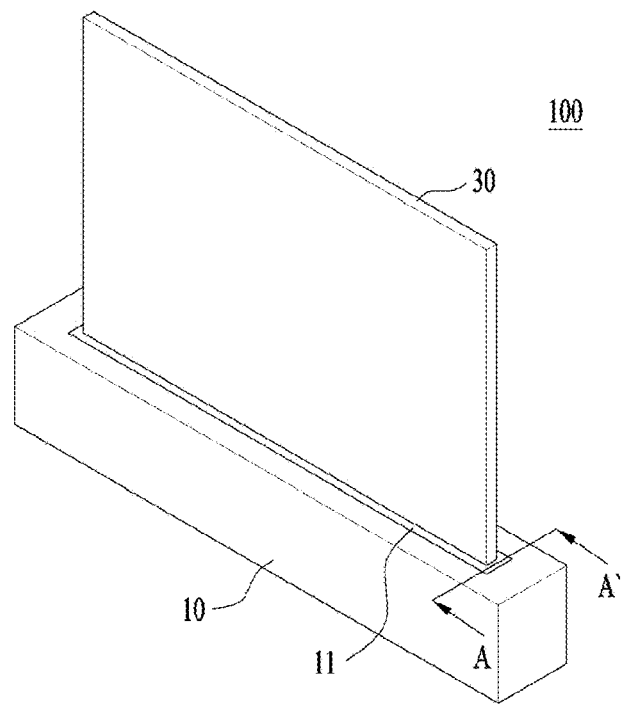
(a)
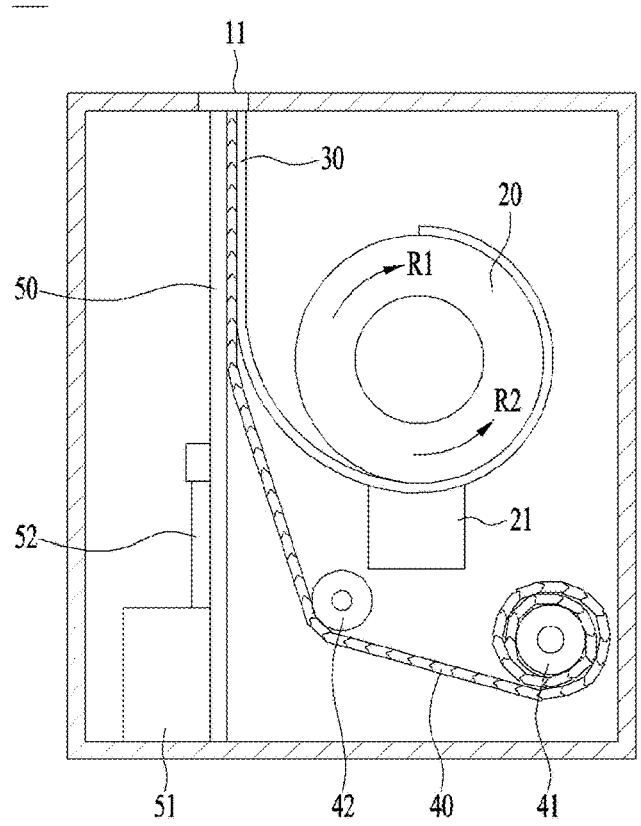
(b)

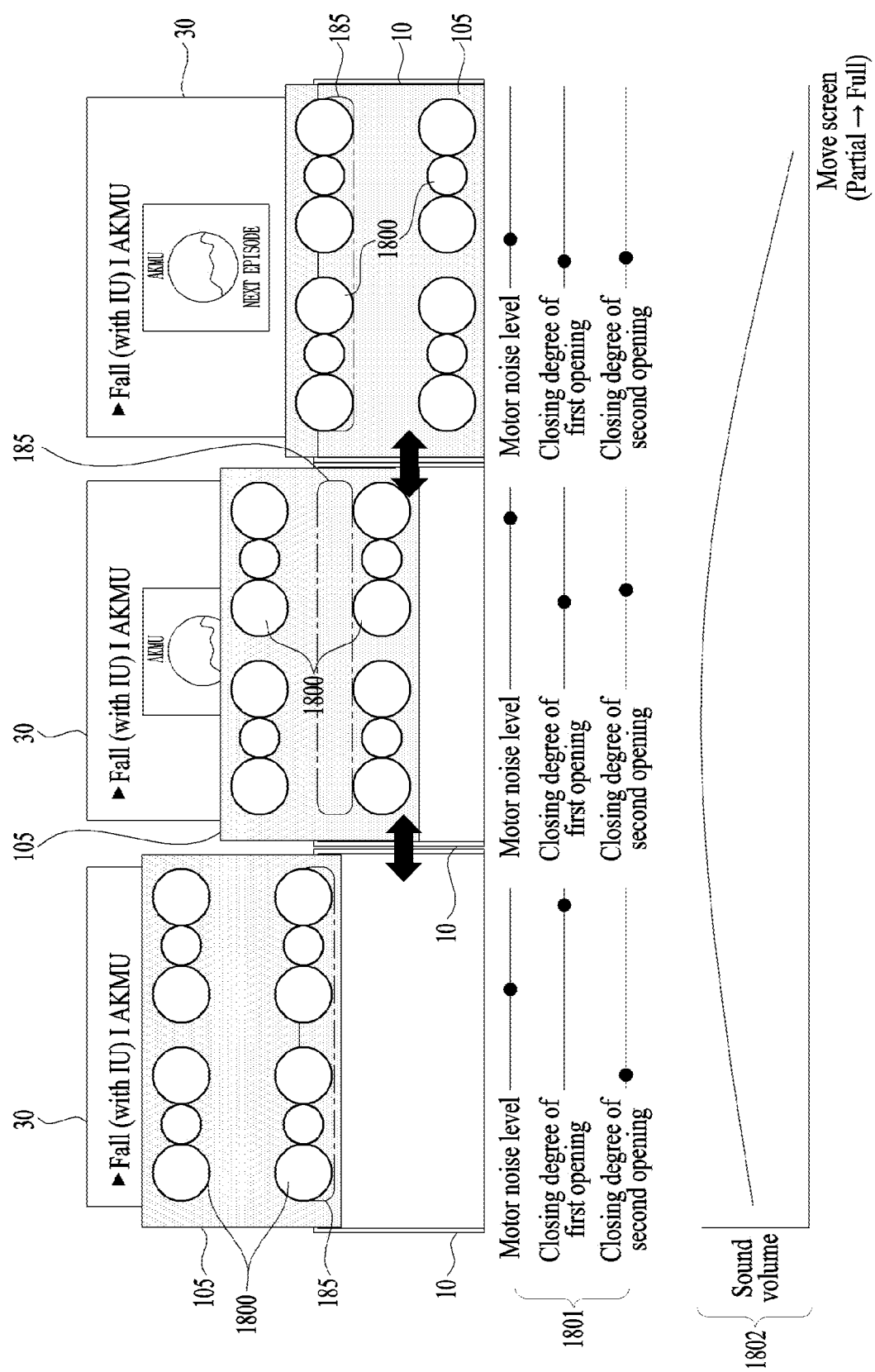

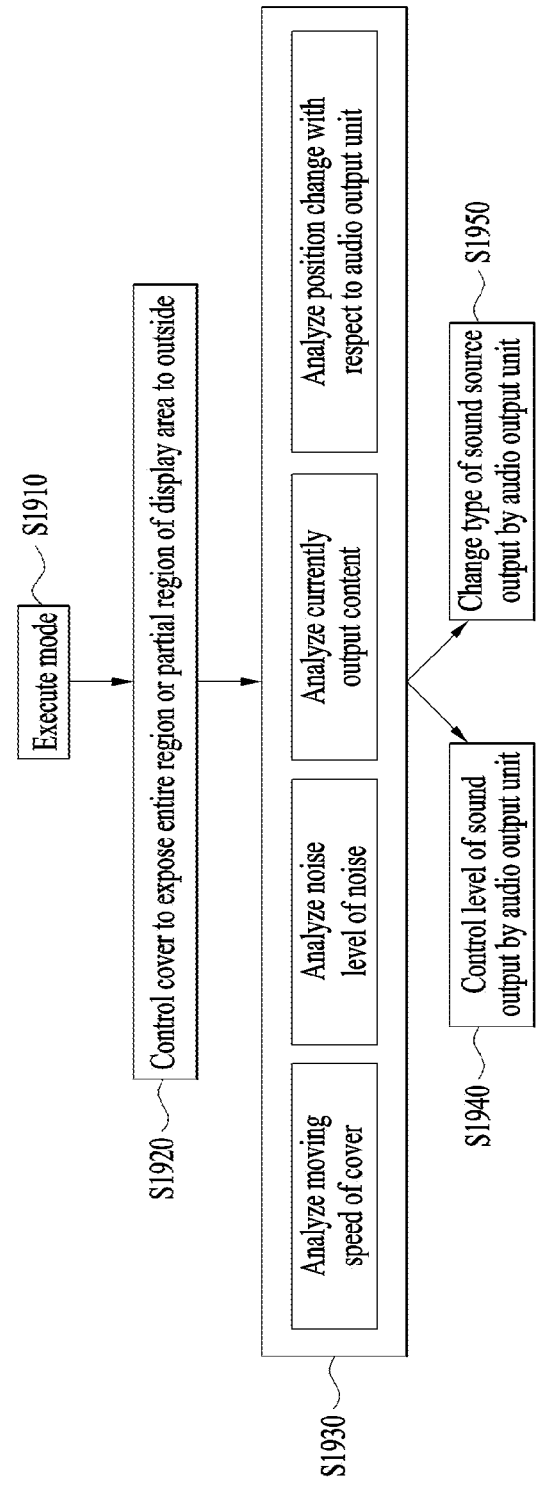

DISPLAY DEVICE AND CONTROL METHOD THEREOF

CROSS-REFERENCE TO RELATED APPLICATION(S)

This application is the National Stage filing under 35 U.S.C. 371 of International Application No. PCT/KR2021/015665, filed on Nov. 2, 2021, the contents of which is hereby incorporated by reference herein in its entirety.

TECHNICAL FIELD

The technical field of the present disclosure is a variety of multimedia devices with a display. More particularly, the present disclosure relates to a display device in which the size of an exposed display area is varied.

BACKGROUND

A display device is a device having a function of receiving, processing, and displaying an image to be viewed by a user. For example, the display device receives a broadcast selected by the user from among broadcast signals transmitted from a broadcasting station, separates an image signal from the received signal, and displays the separated image signal on the display.

Recently, due to the development of broadcasting technologies and network technologies, the functions of the display device have been significantly diversified, and the performance of the device has been improved accordingly. That is, the display device has been developed to provide not only content to be broadcast but also other various contents to the user. For example, the display device may provide game play, music appreciation, internet shopping, user customized information, and the like using various applications as well as programs received from a broadcasting station. To perform such an extended function, the display device may basically be connected to other devices or networks by using various communication protocols, and may provide a user with a ubiquitous computing environment. That is, the display device is advanced to a smart device that enables connectivity and commercial computing to the network.

In the display device according to the related art, all regions of the display are always exposed. However, when a black screen is always exposed even when a user does not watch the display device, the user is not capable of sufficiently utilizing a space.

Research has not been conducted into a method of resolving a problem occurring when a display device moves a cover or a display itself to output a display area to a partial region or an entire region by using a motor.

That is, when the display device moves the cover or the display itself by using the motor, noise due to the motor may be generated, and distortion may occur in sound output according to the position of the speaker.

To resolve such a problem, research on a new form factor of a display device has been actively conducted.

DISCLOSURE

Technical Problem

An embodiment of the present disclosure is to provide a system for selectively exposing a partial region or an entire region of a display area to the outside by using a motor added to a display device.

Another embodiment of the present disclosure defines content displayed in a partial region or an entire region of a display in detail to minimize power consumption of a motor added to the display device. An operation of the motor is expected to consume more power than conventional display devices, and thus is it very important to define specific content displayed in a specific mode.

Another embodiment of the present disclosure provides a method of controlling a display device for resolving a problem due to interference with an audio output unit at a fixed position when a display device moves a cover or a display itself.

Technical Solution

According to an embodiment of the present disclosure, a display device includes a display including a display area configured to output content, an audio output unit configured to output sound, a motor configured to control a cover to expose a partial region of the display area to an outside, and a controller configured to control the display, the audio output unit, and the motor, wherein the controller controls a level of sound output by the audio output unit based on relative positions of the display and the cover while the motor controls the cover to expose the partial region of the display area to the outside.

The controller may control the cover from a first state in which an entire region of the display area is exposed to the outside to a second state in which the partial region of the display area is exposed to the outside, and control the level of the sound output by the audio output unit to be high while converting the first state to the second state.

The controller may control the level of the sound output by the audio output unit to be low while converting the second state to the first state.

The controller may control the level of the sound output by the audio output unit based on relative positions of the audio output unit and the cover while the motor controls the cover to expose the partial region of the display area to the outside.

The controller may change a type of a sound source output by the audio output unit based on content that is currently output in the display area while the motor controls the cover to expose the partial region of the display area to the outside.

The controller may change the type of the sound source based on a frequency of the sound source.

The controller may control the level of the sound output by the audio output unit based on a moving speed of the cover while the motor controls the cover to expose the partial region of the display area to the outside.

The motor may control the display to expose the partial region of the display area, and the controller may control the level of the sound output by the audio output unit based on a moving speed of the display while the motor controls the display to expose the partial region of the display area.

The controller may change a type of a sound source output by the audio output unit based on content that is currently output in the display area while the motor controls the display to expose the partial region of the display area.

The controller may control the level of the sound output by the audio output unit based on noise generated from the motor while the motor controls the display to expose the partial region of the display area.

The display device may further include a housing configured to support the cover and the display, and the audio output unit may be fixed to a preset region of the housing.

The cover may include at least one opening.

According to an embodiment of the present disclosure, a method of controlling a display device in which a size of a display area exposed to an outside is changed includes controlling a cover to expose a partial region of the display area to an outside, by a motor included in the display device, and controlling a level of sound output by an audio output unit based on a moving speed of the cover.

Advantageous Effects

An embodiment of the present disclosure provides a display device and a method of controlling the display device, for selectively exposing a partial region or an entire region of a display area of a display by using a motor added to a display device.

According to another embodiment of the present disclosure, even if a cover or a display moves, sound output from a fixed audio output unit may be controlled to allow a user to view the sound output at a predetermined sound level regardless of movement of the cover or the display.

According to another embodiment of the present disclosure, when the cover or the display is moved by the motor, the sound output from the audio output unit may be controlled to prevent noise generated to move the cover or the display from the motor.

BRIEF DESCRIPTION OF THE DRAWINGS

FIG. 6 is a diagram for explaining a motor for adjusting a size of an exposed display region of a display device according to an embodiment of the present disclosure.

FIG. 18 is a diagram illustrating an operation of an audio output unit when a cover of a display device moves according to another embodiment of the present disclosure.

FIG. 19 is a flowchart for explaining a method of controlling a display device according to an embodiment of the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
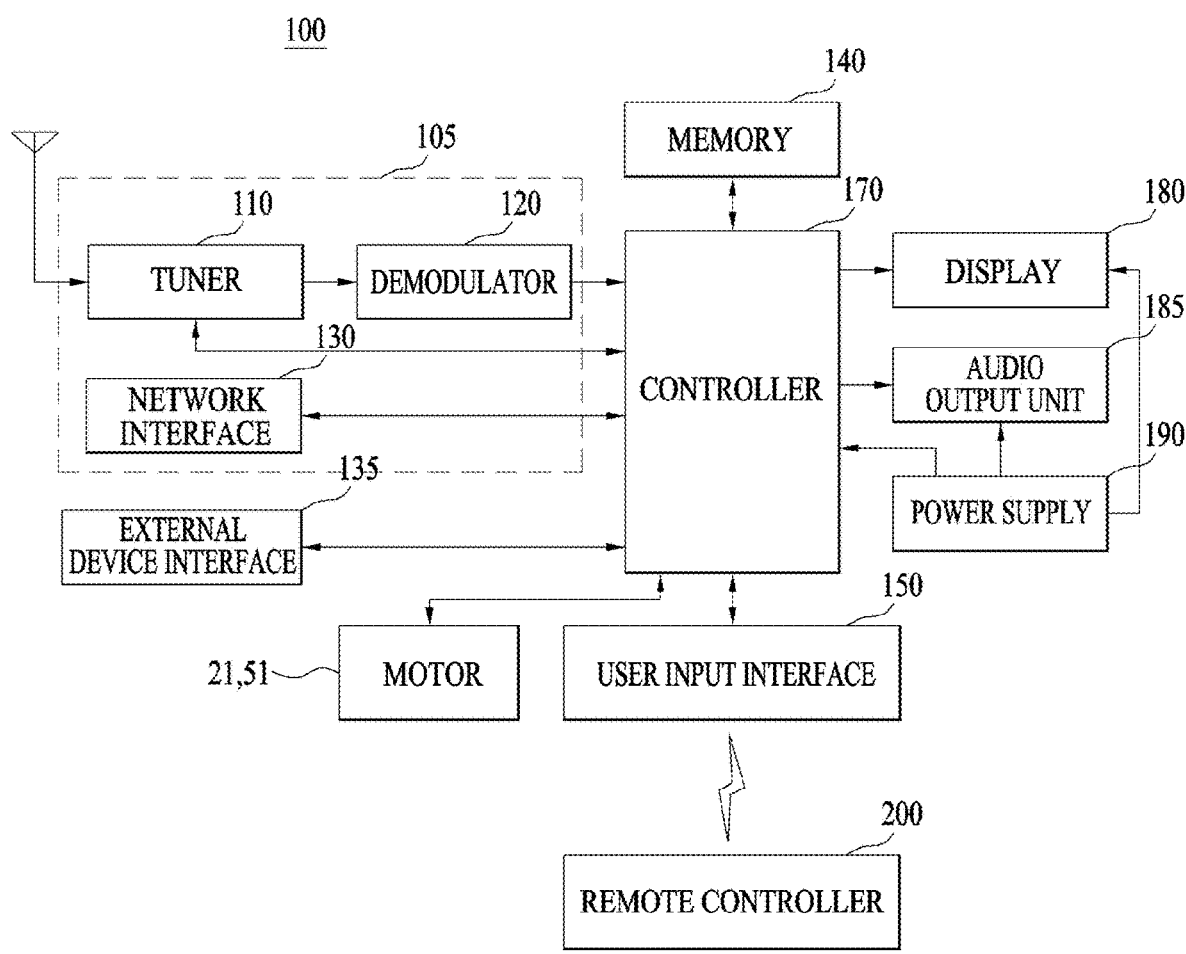
FIG. 1 is a diagram illustrating components in a display device according to an embodiment of the present disclosure.

FIG. 1 is a diagram illustrating components in a display device according to an embodiment of the present disclosure.

Referring to FIG. 1, a display device 100 may include a broadcast receiver 105, an external device interface 135, a memory 140, a user input interface 150, a controller 170, a display 180, an audio output unit 185, and a power supply 190. The components illustrated in FIG. 1 are not indispensable for implementing the display device 100, and thus the device 100 described in the specification may have more or fewer components than those listed above.

The aforementioned components are not shown in detail in the accompanying drawings, and only some important components may be illustrated in the accompanying drawings. However, although not all shown, one of ordinary skill in the art will appreciate that at least the components of FIG. 1 may be included in the display device 100 to implement functionality as a display device.

The broadcasting receiver 105 may include a tuner 110, a demodulator 120 and a network interface 130. As needed, the broadcasting receiver 105 may be configured to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal. More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170. The tuner 110 may be capable of receiving RF broadcast signals from an Advanced Television Systems Committee (ATSC) single-carrier system or from a Digital Video Broadcasting (DVB) multi-carrier system. The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding. For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload. In order to properly handle not only ATSC signals but also DVB signals, the demodulator 120 may include an ATSC demodulator and a DVB demodulator. The TS output from the demodulator 120 may be input to the controller 170 and thus subjected to demultiplexing and A/V signal processing. The processed video and audio signals are output to the display 180 and the audio output unit 185, respectively.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA). The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100. The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VOD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network. In an aspect of this disclosure, when a game application is executed in the image display device, the network interface 130 may transmit data to or receive data from a user terminal connected to the image display device through a network. In addition, the network interface 130 may transmit specific data to or receive specific data from a server that records game scores.

The external device interface 135 may serve as an interface between an external device and the image display device 100. For interfacing, the external device interface 135 may include an A/V Input/Output (I/O) unit (not shown) and/or a wireless communication module (not shown). The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown). The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI)

port, a Red-Green-Blue (RGB) port, and a D-sub port, in order to input the video and audio signals of the external device to the image display device 100. The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards. The external device interface 135 may be connected to various set-top boxes through at least one of the above-described ports and may thus perform an I/O operation with the various set-top boxes. The external device interface 135 may receive applications or an application list from an adjacent external device and provide the applications or the application list to the controller 170 or the memory 140.

The external device interface 135 may establish a communication network with various remote controllers 200, receive a control signal related to an operation of the display device 100 from the remote controller 200, or transmit data related to the operation of the display device 100 to the remote controller 200.

The memory 140 may store various programs necessary for the controller 170 to process and control signals, and may also store processed video, audio and data signals. For example, the memory 140 may store application programs designed to perform various tasks to be processed by the controller 170, and may selectively provide some of the stored application programs when the controller 170 requests.

Programs stored in the memory 140 is not particularly limited as long as the programs may be executed by the controller 170. The memory 140 may temporarily store an image, a voice, or a data signal received from an external device through the network interface 130. The memory 140 may store information about a certain broadcast channel through a channel memory function such as a channel map.

The memory 140 may include at least one of a volatile memory (e.g., DRAM, SRAM, and SDRAM) or a non-volatile memory (e.g., a flash memory, a hard disk drive (HDD), and a solid state drive (SSD)).

While the memory 140 is shown in FIG. 1 as configured separately from the controller 170, to which this disclosure is not limited, the memory 140 may be incorporated into the controller 170, for example.

The user input interface 150 transmits a signal received from the user to the controller 170 or transmits a signal received from the controller 170 to the user. For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication. For example, the user input interface 150 may provide the controller 170 with control signals received from local keys (not shown), such as inputs of a power key, a channel key, and a volume key, and setting values. Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 typically controls the overall operation of the display device 100. The controller 170 may provide or process information or functions appropriate for a user by processing signals, data, information, and the like, which are input or output through all components illustrated in FIG. 1, or driving an application program stored in the device 100. Although not shown, the device 100 may include a substrate therein. The substrate may be a component mounted together with various electronic components, particularly, other circuits and devices that assist the various electronic components, and may be installed in a housing 10. Although not shown in detail, each of the components illustrated in FIG. 1 may be directly installed on the substrate to be controlled by the controller 170, or may be installed in the housing 10 to be electrically connected to the substrate. Accordingly, the controller 170 may be referred to as various names such as a controller and a controlling device, and may control the display device 100 and all components thereof. Accordingly, all operations and controls included in the detailed description of the present application may be considered as features of the controller 170.

The controller 170 may demultiplex the TS received from the tuner 110, the demodulator 120, or the external device interface 135 into a number of signals and process the demultiplexed signals into audio and video data. The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135. While not shown in FIG. 1, the controller 170 may include a DEMUX and a video processor.

The controller 170 may provide overall control to the image display device 100. For example, the controller 170 may control the tuner 110 to tune to an RF broadcast signal corresponding to a user-selected channel or a pre-stored channel. The controller 170 may control the image display device 100 according to a user command received through the user input interface 150 or according to an internal program. Especially the controller 170 may access a network and download an application or application list selected by the user to the image display device 100 over the network. For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185. As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture. The controller 170 may control content playback. The content may include any content stored in the image display device 100, received broadcast content, and externally input content. The content includes at least one of a broadcast image, an externally input image, an audio file, a still image, a Web page, or a text file.

If an application view menu item is selected, the controller 170 may control display of applications or a list of applications that are present in the image display device 100 or downloadable from an external network. The controller 170 may control installation and execution of an application downloaded from the external network along with various UIs. Also, the controller 170 may control display of an image related to the executed application on the display 180, upon user selection.

The controller 170 may perform control to search for a user terminal network-connected to an image display device through the network interface 130, output the searched list of user terminals through the display 180, and receive a selection signal of a user terminal used as a user controller from the list of the searched user terminals through the user interface 150.

The controller 170 may control the motors 21 and 51, and may also control the aforementioned operations of a roller 20, a cover 40 and a supporter 50 according to the control. The controller 170 may control expansion and contraction of the display 30 based on information related to deformation of a flexible display 30, sensed by a deformation sensor. That is, the controller 170 may control the motors 21 and 51, the roller 20, the cover 40, and the supporter 50 to expand and contract the display 30 according to the sensed information. The controller 170 may sense the size of an actual screen formed according to the winding or unwinding of the display 30 according to the information sensed by the size sensor. More specifically, the controller 170 may display information only on a screen of the display 30 actually exposed to the outside of the housing 10 by using the information of the size sensor. The controller 170 may turn off a portion of the display 30 hidden inside the housing 10. According to this control, the controller 170 may effectively reduce power consumption, and similarly, may effectively reduce heat generation.

To sense a gesture or movement of the user, as described above, a sensing unit (not shown) having at least one of a touch sensor, a voice sensor, a position sensor, and an operation sensor may be further provided in the display device 100. The sensing unit may include a camera to directly identify the movement of the user or another camera included in the home. The signal sensed by the sensing unit (not shown) may be transmitted to the controller 170, and the controller 170 may recognize a command by a gesture of the user by using the signal. The controller 170 may check whether the user approaches the display device 100 or whether the user is present at the home.

The display 180 may generate a driving signal by converting an image signal, a data signal, an on screen display (OSD) signal, and a control signal, which is processed by the controller 170, or an image signal, a data signal, and a control signal, which are received from the network interface 130. The display 180 may include a display panel including a plurality of pixels. The plurality of pixels included in the display panel may include subpixels of RGB. Alternatively, the plurality of pixels included in the display panel may include subpixels of RGBW. The display 180 may convert an image signal, a data signal, an OSD signal, and a control signal, which are processed by the controller 170, to generate a driving signal for the plurality of pixels.

The display 180 may be various types of displays such as a Plasma Display Panel (PDP), a Liquid Crystal Display (LCD), an Organic Light-Emitting Diode (OLED) display, a flexible display, and a 3D display. The 3D display 180 may be classified into glasses-free and glasses-based types.

The display 180 may also be a touchscreen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

The power supply 190 supplies power to the image display device 100. Particularly, the power supply 190 may supply power to the controller 170 which may be implemented as a System On Chip (SOC), the display 180 for displaying an image, and the audio output unit 185 for audio output. The power supply 190 may provide power to related components including the controller 170 to automatically start the operation of the display device according to an external command and a preset condition. For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The power supply 190 receives power from the outside and distributes the power to each component. The plurality of displays 180 may include a first power supply (not shown) to supply power for driving each display panel. A second power supply (not shown) to supply power to the first power supply may be provided in a main body frame (not shown).

When a wired method is used to transmit the power from the second power supply to the first power supply, the second power supply and the first power supply may be connected to each other when the display 180 is coupled to the main body frame.

To more conveniently supply power, a wireless charging method may be used. Wireless charging may be performed in a magnetic resonance manner by overlapping a pair of coils, and a charging coil may be used as the first power supply and a transmission coil may be used as the second power supply.

When power is applied to the transmission coil located in the main body frame, a current flows through the transmission coil, forms an electromagnetic field, and supplies power to each component of the display 180 while current flows through the charging coil located in the electromagnetic field formed by the transmission coil.

The remote controller 200 transmits a user input to the user input interface 150. For transmission of user input, the remote controller 200 may use various communication techniques such as Bluetooth, RF communication, IR communication, Ultra Wideband (UWB) and ZigBee. In addition, the remote controller 200 may receive a video signal, an audio signal or a data signal from the user input interface 150 and output the received signals visually, audibly or as vibrations. For the functions described above, the remote controller 200 may include an input element such as a physical button and a touch screen.

The display device 100 may further include an image capturing unit (not shown). The image capturing unit may capture a user. The image capturing unit may be implemented by one camera, but the present disclosure is not limited thereto, and may be implemented by a plurality of cameras. The image capturing unit may be embedded in the display device 100 or separately disposed on the display 180. Image information photographed by the image capturing unit may be input to the controller 170. The controller 170 may recognize a location of the user based on the image captured by the image capturing unit. For example, the controller 170 may determine a distance (z-axis coordinate) between the user and the display device 100. The controller 170 may identify the x-axis coordinate and the y-axis coordinate in the display 180 corresponding to a user position. The controller 170 may sense a gesture of the user based on an image captured by the image capturing unit, a signal sensed by the sensor unit, or a combination thereof.

The structure of the display device 100 described above may simply control expansion and contraction of the display 30. However, to provide a more improved function, the expansion and contraction needs to be associated with a type and amount of information to be provided, which needs to be supported by appropriate control considering the structure and characteristics of the device 100. The display device 100 basically involves interaction with a user in implementing an intended function. Therefore, through optimization of various controls, the intended functional improvement may be achieved more effectively and efficiently, including improvement of user environment and user interface of the user, and furthermore, the user experience of the smart device 100, such as ease of use and convenience, may also be significantly improved.

The above-described display device 100 may be a fixed or mobile digital broadcast receiver for receiving a digital broadcast.

The block diagram of the image display device 100 illustrated in FIG. 1 is purely exemplary. Depending upon the specifications of the image display device 100 in actual implementation, the components of the image display device 100 may be combined or omitted or new components may be added.

That is, two or more components may be incorporated into one component or one component may be configured as separate components, as needed. In addition, the function of each block is described for the purpose of describing the aspect of this disclosure and thus specific operations or devices should not be construed as limiting the scope and spirit of this disclosure.

Figure 2:
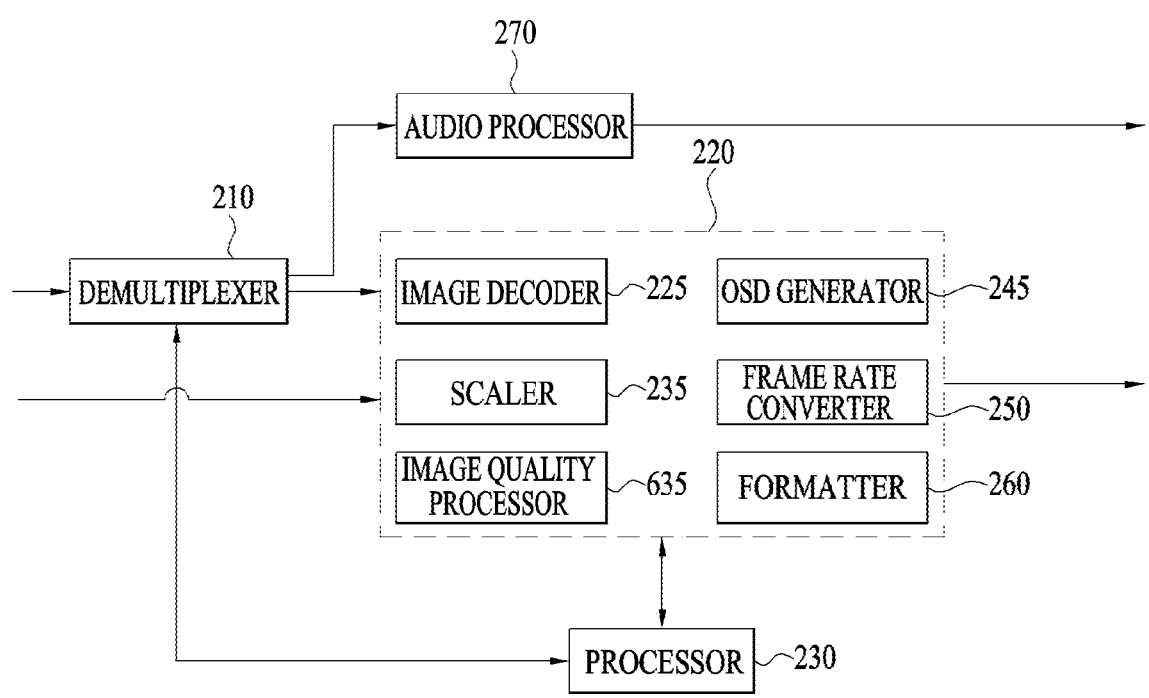
FIG. 2 is a diagram for explaining components of a controller of a display device according to an embodiment of the present disclosure.

FIG. 2 is a diagram for explaining components of a controller of a display device according to an embodiment of the present disclosure.

Referring to FIG. 2, the controller 170 according to an embodiment of the present disclosure may include a demultiplexer 210, an image processor 220, a processor 230, and/or an audio processor 270. The controller 170 may further include a data processor (not shown).

The demultiplexer 210 may demultiplex an input stream. For example, when an MPEG-2 TS is input, the MPEG-2 TS may be demultiplexed into video, audio, and data signals. The stream signal input to the demultiplexer 210 may be a stream signal output from the tuner 110, the demodulator 120, or the external device interface 130.

The image processor 220 may perform signal processing on an input image. For example, the image processor 220 may perform image processing of the demultiplexed video signal from the demultiplexer 210.

To this end, the image processor 220 may include an image decoder 225, a scaler 235, an image quality processor 635, an image encoder (not shown), an OSD generator 245, a frame rate converter 250, and/or a formatter 260.

The video decoder 225 may decode the demultiplexed video signal, and the scaler 235 may perform scaling to output the resolution of the decoded video signal from the display 180.

The image decoder 225 may include decoders of various standards. For example, the image decoder 225 may include MPEG-2 and H.264 decoders, a 3D image decoder for a color image and a depth image, and a decoder for a plurality of view images.

The scaler 235 may scale an input image signal that is completely decoded by the image decoder 225. For example, when the size or resolution of the input image signal is low, the scaler 235 may up-scale the image signal and down-scale the image signal when the size or resolution of the input image signal is high.

The image quality processor 635 may perform image quality processing on an input image signal, which is completely image-decoded by the image decoder 225. For example, the image quality processor 635 may perform noise removal processing of the input image signal, expand a resolution of a grayscale of the input image signal, improve image resolution, perform high dynamic range (HDR)-based signal processing, change a frame image rate, or perform image quality processing corresponding to the characteristics of a panel, in particular, an organic light emitting panel.

The OSD generator 245 may generate an OSD signal according to a user input or autonomously. For example, based on a user input signal, a signal for displaying various types of information on a screen of the display 180 as graphic or text may be generated. The generated OSD signal may include various data such as a user interface screen, various menu screens, widgets, and icons of the image display device 100. The generated OSD signal may include a 2D object or a 3D object.

The OSD generator 245 may generate a pointer to be displayed on a display, based on a pointing signal input from the remote controller 200. In particular, the pointer may be generated by a pointing controller, and the OSD generator 245 may include the pointing controller (not shown). Needless to say, the pointing controller (not shown) may be provided separately without being provided in the OSD generator 245.

The frame rate converter (FRC) 250 may convert a frame image rate of an input image. The frame rate converter 250 may output the frame image rate without separate frame image rate conversion.

The formatter 260 may change a format of an input image signal into an image signal for displaying an image on a display and output the image signal. In particular, the formatter 260 may change the format of the image signal to correspond to the display panel.

The processor 230 may control overall operations of the image display device 100 or the controller 170. For example, the processor 230 may control the tuner 110 to tune to an RF broadcast corresponding to a channel selected by a user or a pre-stored channel.

The processor 230 may control the image display device 100 by a user command input through the user input interface 150 or an internal program. The processor 230 may perform data transmission control with the external device interface 135 or the network interface 130. The processor 230 may control operations of the demultiplexer 210 and the image processor 220 in the controller 170.

The audio processor 270 in the controller 170 may perform voice processing of the demultiplexed audio signal. To this end, the audio processor 270 may include various decoders. The audio processor 270 in the controller 170 may process a base, a treble, and volume control.

The data processor (not shown) in the controller 170 may perform data processing on the demultiplexed data signal. For example, when the demultiplexed data signal is a coded data signal, the demultiplexed data signal may be decoded. The encoded data signal may be electronic program guide information including broadcast information such as a start time and an end time of a broadcast program broadcasted in each channel.

FIG. 2 is a block diagram of the controller 170 according to an embodiment of the present disclosure. Each component of the block diagram may be integrated, added, or omitted according to the specification of the controller 170 actually implemented. In particular, the frame rate converter 250 and the formatter 260 may be separately provided in addition to the image processor 220.

Figure 3:
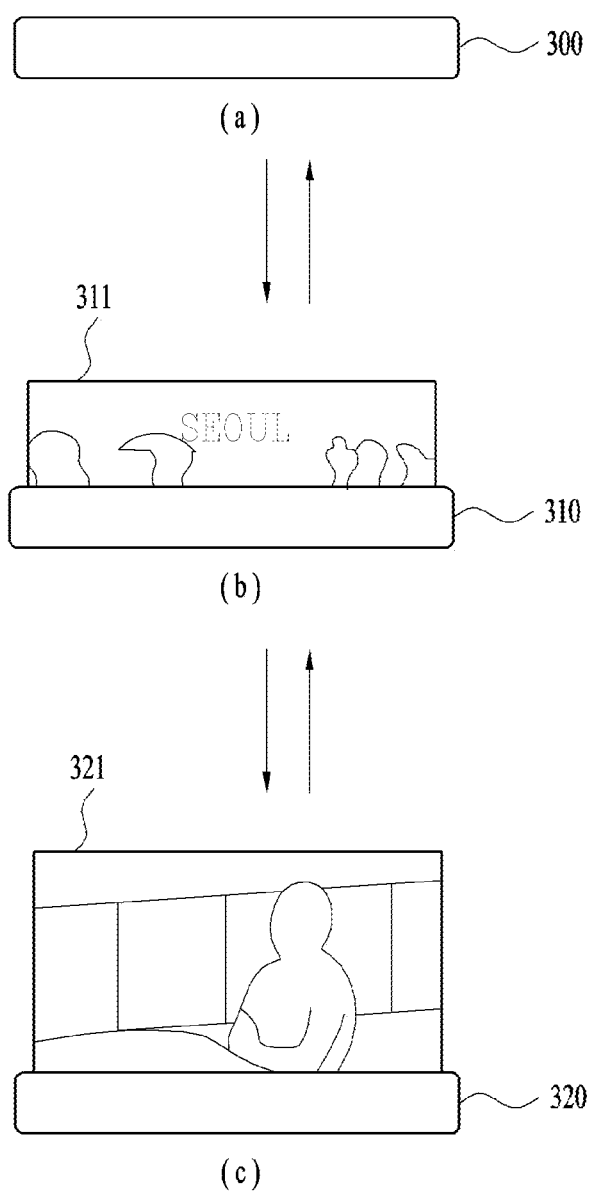
FIG. 3 is a diagram illustrating an operation of a display device according to an embodiment of the present disclosure.

FIG. 3 is a diagram illustrating an operation of a display device according to an embodiment of the present disclosure.

Unlike the related art, the display of the display device according to an embodiment of the present disclosure may be included in the housing 300, as shown in (a) of FIG. 3. When a certain condition is satisfied (for example, when a signal pressing a power button of a remote controller once is input), as shown in (b) of FIG. 3, only a partial region 311 of the display device of the display device may be exposed from the housing 310.

When another certain condition is satisfied (for example, when a signal pressing the power button of the remote controller twice is input), as illustrated in (c) of FIG. 3, an entire region 321 of the display of the display device may be designed to be exposed from the housing 320. Needless to say, a mode in (c) of FIG. 3 may be switched to a mode in (b) and a mode in (a) in a reverse direction, and the mode in (b) may be skipped.

To implement this, the displays 311 and 321 of the display device may include a material for forming a flexible display. For example, a bendable or rollable flexible display material may be for a plastic OLED (POLED or P-OLED), and may be finished with a colorless polyimide (CPI) film, which is a plastic material. Here, the CPI film is for a transparent but rigid plastic material like glass, may freely change a shape, and may not easily break even a pressure is applied.

The displays 311 and 321 may be wound around rollers inside the housings 310 and 320 and then unfolded, and a motor for driving the rollers may be required. This will be described below in more detail with reference to FIG. 6.

To be distinguished from the related art, a display device designed as shown in FIG. 3 may be defined as a rollable display device or a flexible display device, a mode illustrated in (a) of FIG. 3 may be defined as a zero view, a mode illustrated in (b) of FIG. 3 may be defined as a partial view or a line view, and a mode illustrated in (c) of FIG. 3 may be defined as a full view.

Figure 4:
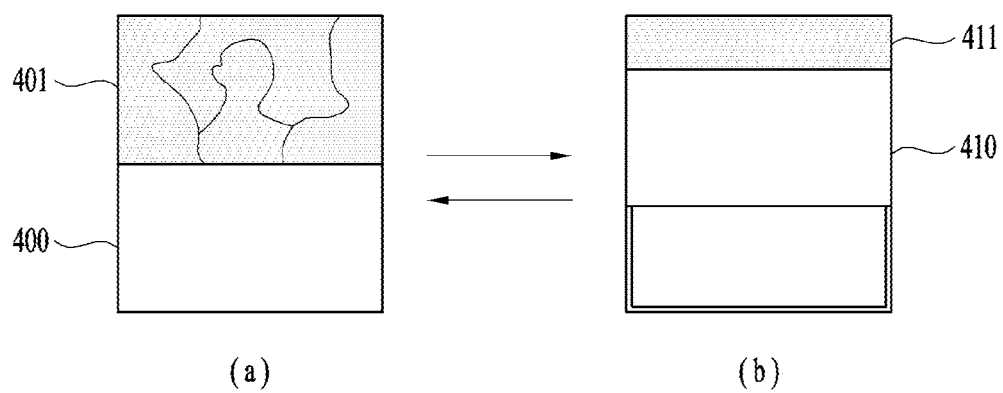
FIG. 4 is a diagram illustrating an operation of a display device according to another embodiment of the present disclosure.

FIG. 4 is a diagram illustrating an operation of a display device according to another embodiment of the present disclosure.

Although it has been described with reference to FIG. 3 that a flexible display material is used for a display of the display device, the display device may not necessarily include a material for a flexible display, and a display of a general display device may be used without change in the embodiment of FIG. 4.

However, differently from the related art, as shown in (a) of FIG. 4, covers 400 having the same size or similar sizes may be positioned under the display 401 of the display device. When a certain condition is satisfied (for example, when a signal pressing a power button of a remote controller once is input), as shown in (b) of FIG. 4, a cover 410 may be designed to move in an up direction to expose only a partial region of a display 411 of the display device. Needless to say, a mode in (a) of FIG. 4 may be switched to a mode shown in (a) of FIG. 4. To freely move the cover shown in FIG. 4 in an up/down direction, a motor may be designed to be positioned around the cover.

To be distinguished from the related art, the display device designed as shown in FIG. 4 may be defined as an Atelier TV, a mode illustrated in (a) of FIG. 4 may be defined as a full view, and a mode illustrated in (b) of FIG. 4 may be defined as a line view or a partial view.

In an embodiment of the present disclosure, as shown in (b) of FIG. 4, the display device may define a line view state as a default mode. That is, unlike FIG. 3, the display device of FIG. 4 may have a line view state rather than a zero view as a default.

Figure 5:
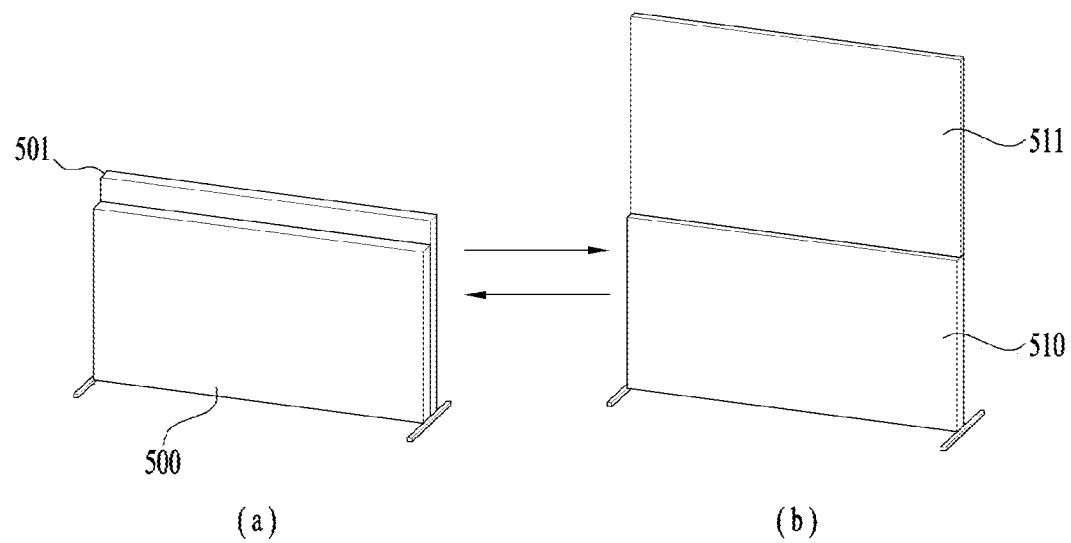
FIG. 5 is a diagram for explaining an operation fo a display device according to another embodiment of the present disclosure.

FIG. 5 is a diagram for explaining an operation of a display device according to another embodiment of the present disclosure.

Similar to FIG. 4, a material for a flexible display may not necessarily be used as a display of a display device, and a general display may be used without change. However, differently from FIG. 4, the display of the display device other than a cover itself is moved.

For example, as shown in (a) of FIG. 5, the cover 500 having the same size or similar sizes is designed to be positioned under the display 501 of the display device. A display 501 and the cover 500 of the display device may be apart from each other at a certain interval to prevent friction from being generated. When a certain condition is satisfied (for example, when a signal pressing a power button of the remote controller once is input), as illustrated in (b) of FIG. 5, the display 511 of the display device may move in an up direction to design the entire region of the display 511 of the display device to be exposed. In this case, differently from FIG. 4, a cover 510 may not move.

Needless to say, in a mode of (b) of FIG. 5 may be switched to a mode of (a) of FIG. 5. To freely move the displays 501 and 511 of the display device shown in FIG. 5 in an up/down direction, a motor may be designed around the displays 501 and 511 of the display device.

To be distinguished from the related art, a display device designed as shown in FIG. 5 may be defined as an interior TV, a mode illustrated in (a) of FIG. 5 may be defined as a partial view or a line view, and a mode illustrated in (b) of FIG. 5 may be defined as a full view.

In an embodiment of the present disclosure, as shown in (a) of FIG. 5, the display device may define a partial view state as a default mode. That is, unlike FIG. 3, the display device of FIG. 5 may have a partial view state rather than a zero view as a default.

FIG. 6 is a diagram for explaining a motor for adjusting a size of an exposed display region of a display device according to an embodiment of the present disclosure.

Although the motor is applicable to the embodiments of FIGS. 4 and 5, it is assumed that the motor is applied to the display device of FIG. 3 for convenience of description, and FIG. 6 will be described.

(a) of FIG. 6 illustrates a screen of the housing and the display device shown in FIG. 3 in a diagonal direction. (b) of FIG. 6 is a cross-sectional view taken along a line A-A' of (a) of FIG. 6.

As shown in (a) of FIG. 6, the display device 100 may further include the housing 10.

The housing 10 may be configured to accommodate various components, and more particularly, the housing 10 may accommodate, for example, the display 30 and various electronic components for operating the display 30.

As shown in (b) of FIG. 6, the display device 100 may include the roller 20 rotatably installed in the housing 10. Although not shown, the roller 20 may include sleeves formed at both ends, and the sleeves may be rotatably supported with respect to the housing 10 by bearings.

The roller 20 may be connected to the motor 21 installed in the housing 10, and may rotate in a clockwise direction R1 or a counterclockwise direction R2 as illustrated by the motor 21. To adjust a rotation speed of the roller 20, a gear train may be located between the motor 21 and the roller 20.

The display device 100 may include the display 30 configured to display various contents and information related to the contents. For example, the display 30 may display video content, audio content, and other ancillary content. Such contents include various pieces of information associated thereto, for example, a playback time in a video content, a title of the content, and the like, and the display 30 may also display such relevant information. The display 30 may include at least one of a liquid crystal display (LCD), a thin film transistor-liquid crystal display (TFT-LCD), an organic light-emitting diode (OLED) display, a flexible display, a three-dimensional (3D) display, an e-ink display.

In detail, although not shown in detail, the display 30 may include a display module and a window covering the display module. The display module may constitute a display device such as an LCD or an OLED as described above, and may be a component that actually displays image information. The window may be located on a portion exposed to a user of the display module, that is, a front surface in terms of the drawing, and may protect the display module from the outside. In addition to such a protection function, the window needs to allow information displayed on the display module to be shown to the user through the window. Accordingly, the window may include a material having appropriate strength and transparency. The display module may be directly attached to a rear surface of the window. The display module may be directly attached to the window in various ways, and an adhesive may be most conveniently used for direct attachment.

The display 30 may include a touch sensor (not shown) for sensing a touch on the display 30 to receive a control command by a touch method. The content which is input in a touching manner may be a text or a numerical value, or a menu item to be indicated or designated in various modes. The touch sensor may be configured in the form of a film having a touch pattern to be located between the window and the display module, or may include a metal wire which is patterned directly on a rear surface of the window. Alternatively, the touch sensor may be integrally formed with the display module. For example, the touch sensor may be located on a substrate of the display module or may be provided inside the display module. As such, the display 30 may form a touch screen together with the touch sensor, and in this case, the touch screen may function as a user input unit. According to the complex configuration of the display 30, the display 30 is displayed as a single module or an assembly including a plurality of layers, that is, components.

The display 30 may be accommodated in the housing 10 as illustrated in such a manner that the display device 100 may have a compact structure. To accommodate the display 30 in the housing 10, the display 30 needs to be basically deformed. Accordingly, the display device 100 may use a flexible display as the display 30.

The display 30 may include a flexible display to be deformable by an external force. The deformation may be at least one of bending, curving, folding, twisting, and rolling of the display 30. A typical flexible display is manufactured on a thin flexible substrate to be bent, curved, folded, twisted, or rolled, such as paper, while maintaining the characteristics of the existing flat panel display described above, and thus may not easily break. The flexible display 30 may be combined with a touch sensor as described above to implement a flexible touch screen.

Due to this deformable property, as shown in (b) of FIG. 6, the display 30 may be rolled on the roller 20. The display 30 may be wound around the roller 20 or unwound from the roller 20 according to a rotation direction of the roller 20. The display 30 may be unwound from the roller 20 and project or roll out to the outside of the housing 10. On the contrary, the display 30 may be wound around the roller 20 to retract/roll in the housing 10. In detail, as shown in (b) of FIG. 6, when the roller 20 rotates in a clockwise direction R1, the display 30 may be unwound from the roller 20 and be expanded to the outside of the housing 10 through an opening 11 formed in the housing 10.

Therefore, as described above, a screen accommodated in the housing 300 in (a) of FIG. 3 may be extended to the outside of the housing 310 as shown in (b) of FIG. 3, and a screen 311 having a certain size may be formed. When the roller 20 further rotates in the clockwise direction R1, the display 30 may be further unwound from the roller 20. Therefore, as shown in (c) of FIG. 3, the screen may protrude to a larger size outside the housing 10, and may form a screen of a larger size. When the roller 20 rotates in the counterclockwise direction R1, the display 30 may be wound around the roller 20 and may be contracted into the housing 10 through the opening 11. Accordingly, as shown in (b) of FIG. 3, the screen 321 of (c) of FIG. 3 may be contracted to have a relatively smaller size inside the housing 310, thereby forming a smaller screen. When the roller 20 further rotates counterclockwise R2, the display 30 may be further wound around the roller 20. Therefore, as shown in (a) of FIG. 3, the screen may not protrude to the outside of the housing 300, and may be completely accommodated in the housing 300. As described above, the display device 100 may control expansion of the display 20 to a required size, thereby forming a screen of a desired size. When the display device 100 is not in use, the display 20 may be completely accommodated in the housing 10, and the display device 100 may have a compact structure because the display device 100 is expanded only in a required size. As a result, the size of the screen formed on the display 20 may vary according to winding and unwinding of the flexible display 20.

Although not shown, the display device 100 may include a deformation sensor for sensing deformation of the flexible display 30. The deformation sensor may be provided in the flexible display 30 or the housing 10 to detect information related to deformation of the flexible display 30. Here, the information related to the deformation may include a direction in which the flexible display 20 is deformed, a degree of deformation, a deformation position, a deformation time, and an acceleration in which the deformed flexible display 30 is restored, and may further include various information to be sensed by bending of the flexible display 30.

A front portion of the display 30, which is expanded from the display device 100, may be protected by the window, while a rear portion of the display 30 may be exposed. The display 30 includes sensitive electronic components and substrates, and thus the display 30 needs to be properly protected to prevent malfunction. Accordingly, as illustrated in (b) of FIG. 6, the display device 100 may include the cover 40 configured to cover the rear portion of the extended display 30.

The cover 40 may include a plurality of links connected to each other. The link may have a width corresponding to a width of the display 30, and the links connected to each other, that is, the cover 40, may form a single plate covering the rear portion of the display 30. Any one of the links is pivotable with respect to another adjacent link, and thus as shown in the drawing, the cover 40 may be wound around a first roller 41 and may be guided to a rear side of the display 30 by the second roller 42.

When the display 30 is expanded during an operation of the display device 100, the first roller 41 may rotate to unwind the cover 40. The unwound cover 40 is guided by the second roller 41 and is attached to the rear portion of the display 30. Accordingly, the cover 40 may be extended to the outside of the housing 10 together with the display 30 to protect the rear portion of the display 30.

When the display 30 is contracted, the first roller 41 may rotate in an opposite direction to separate the cover 40 from the display 30, and the separated cover 40 may be guided by the second roller 42 to be wound around the first roller 41. In the cover 40, the first roller 41 may be driven by the motor 21 together with the roller 20, and a separate motor for driving the first roller 41 may be installed in the housing 10.

The display 30 may be difficult to maintain an expanded state due to the flexibility thereof. Accordingly, the display device 100 may include the supporter 50 configured to support the extended display 30. The supporter 50 may be extended to the outside of the housing 10 through the opening 11 by the motor 51 and the auxiliary supporter 52 connected thereto. Accordingly, the supporter 50 may be extended to the outside of the housing 10 together with the display 30. Accordingly, the display 30 expanded by the supporter 50 may be stably supported to display content to the user.

Figure 7:
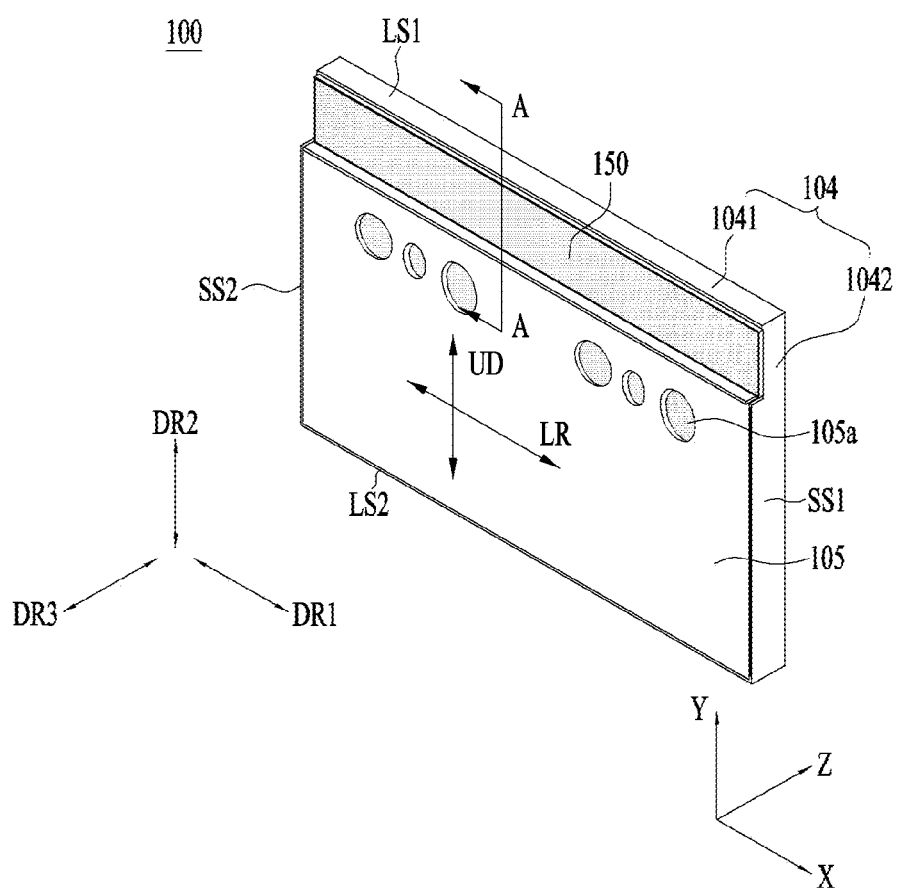
FIGS. 7 and 8 are perspective views illustrating a display device according to an embodiment of the present disclosure.
Figure 8:
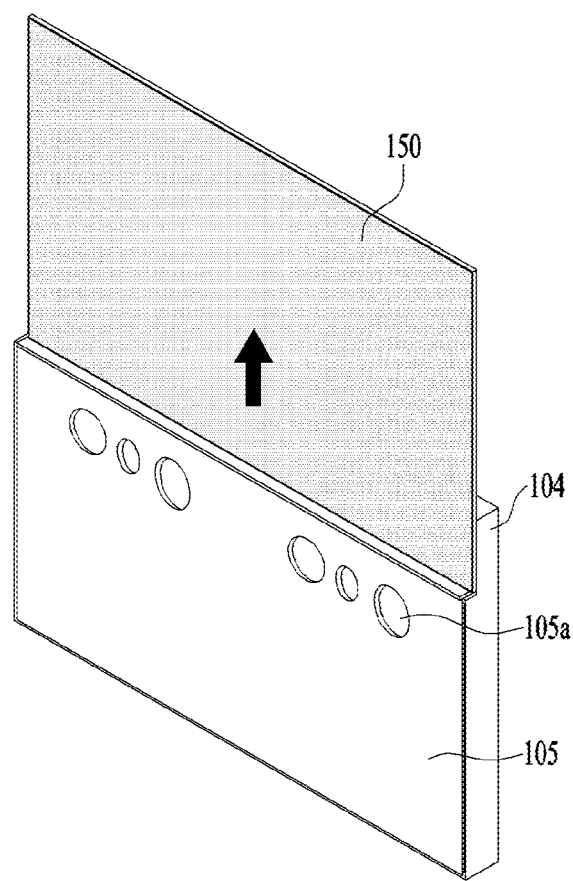

FIGS. 7 and 8 are perspective views illustrating a display device according to an embodiment of the present disclosure.

Referring to FIG. 7, a display device 100 may have a rectangular shape including a first long side LS1, a second long side LS2 facing the first long side LS1, a first short side SS1 adjacent to the first long side LS1 and the second long side LS2, and a second short side SS2 facing the first short side SS1.

Here, the first short side SS1 may be referred to as a first side area, the second short side SS2 may be referred to as a second side area facing the first side area, the first long side LS1 may be referred to as a third side area adjacent to the first side area and the second side area and located between the first side area and the second side area, and the second long side LS2 may be referred to as a fourth side area adjacent to the first side area and the second side area, located between the first side area and the second side area, and facing the third side area.

Although the lengths of the first and second long sides LS1 and LS2 are illustrated to be greater than the lengths of the first and second short sides SS1 and SS2 for convenience of description, the lengths of the first and second long sides LS1 and LS2 may be approximately the same as those of the first and second short sides SS1 and SS2.

In the following description, a first direction DR1 may be parallel to the long sides LS1 and LS2 of the display device 100, and a second direction DR2 may be parallel to the short sides SS1 and SS2 of the display device 100. A third direction DR3 may be a direction perpendicular to the first direction DR1 and/or the second direction DR2.

In another aspect, a side toward which the display device 100 displays an image may be referred to as a front side or a front side. When the display device 100 displays an image, a side toward which an image is not capable of being observed may be referred to as a rear side or a rear surface. When the display device 100 is viewed from the front side or front surface, a side at the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

The first long side LS1, the second long side LS2, the first short side SS1, and the second short side SS2 may be referred to as edges of the display device 100. Points at which the first long side LS1, the second long side LS2, the first short side SS1, and the second short side SS2 intersect with each other may be referred to as corners. Here, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an upward and downward direction UD.

The display device includes a display module 150 occupying most of a front surface and housing 102, 104, and 105 covering a rear surface, a lateral surface, and the like of the display module 150 and packaging the display module 150.

Recently, the display device 100 may use the display module 150 that is to be flexible, such as light emitting didoes (LEDs) or organic light emitting diodes (OLEDs) to implement a curved screen on a plane.

An LCD mainly used in the related art receives light through a backlight unit because the LCD is difficult to emit light by itself. The backlight unit is a light source and is a device for uniformly supplying light supplied from the light source to a liquid crystal positioned on a front surface. Although the backlight unit is gradually thinner and a thin LCD is implemented, it is difficult to implement the backlight unit with a flexible material, and when the backlight unit is bent, it is difficult to uniformly supply light to liquid crystal, thereby changing the brightness of a screen.

On the other hand, in the case of an LED or an OLED, each element constituting a pixel emits light by itself, and thus a backlight unit is not used and the display module 150 may be implemented to be bent. Each element is self-emitting, and thus the display module 150 may be implemented to be bent using an LED or an OLED because the brightness of each element is not affected even though a positional relationship between neighboring elements is changed.

An organic light emitting diode (OLED) panel is mainly registered in the middle of 2010, thereby rapidly replacing an LCD in a small-sized display market. The OLED display is a display made using a self-light emitting phenomenon that light is emitted when a current flows in a fluorescent organic active material, and there is almost no afterimage when an image quality reaction rate is faster than the LCD.

The OLED uses three types of phosphor organic compounds such as red, green, and blue having a self-emission function and is a light emitting display product using a phenomenon in that electrons injected from a negative electrode and a positive electrode and positive electric charges are combined in an organic material to emit light by itself, and thus there is no need for a backlight (backlight device) that deteriorates color.

A LED panel is a technology that uses one LED element as one pixel, and implements the display module 150 to be bent by reducing the size of an LED element compared to a conventional LED element. In a conventional LED TV, an LED is used as a light source of a backlight unit for supplying light to an LCD, and the LED itself dese not constitute a screen.

The display module includes a display panel, a coupling magnet disposed on a rear surface of the display panel, a first power supply, and a first signal module. The display panel may include a plurality of pixels R, G, and B. The plurality of pixels R, G, and B may be formed in each region in which a plurality of data lines and a plurality of gate lines cross each other. The plurality of pixels R, G, and B may be located or arranged in a matrix form.

For example, the plurality of pixels R, G, and B may include a red color (R) sub-pixel, a green color (G) sub-pixel, and a blue color (B) sub-pixel. The plurality of pixels R, G, and B may further include a white color (W) sub-pixel.

A side of the display module 150, which displays an image, may be referred to as a front side or a front surface. When the display module 150 displays the image, a side of the display module 150, from which the image is not observed, may be referred to as a rear side or a rear surface.

In the display device 100 according to the present disclosure, the size of a screen of the display module 150, which is exposed to the outside, may be changed by moving the display module 150 in upward and downward directions. FIG. 7 shows a basic mode in which the display module 150 is exposed to the minimum. FIG. 8 may correspond to an extension mode in which the display module 150 is exposed to the maximum. The display module 150 may be switched to the extension mode from the basic mode while being drawn out to the outside in multiple stages.

For convenience of description, a screen located inside the housings 102, 104, and 105 is referred to as a first region and a screen exposed to the outside is referred to as a second region. The sizes of the first region and the second region may vary.

In the basic mode, the size of the first region is maximum, and the size of the second region is minimum, and in the extension mode, the size of the second region is maximum.

The display module 150 may also include the second region exposed to the outside in the basic mode, and the size of a rear cover 102 in a rear direction may be larger than a front cover 105 located in a front direction in correspondence to the size of the second region exposed in the basic mode. That is, in the basic mode, the size of the second region may correspond to a size difference between the front cover 105 and the rear cover 102.

When the sizes of the front cover 105 and the rear cover 102 are different from each other, a supporting force for supporting the display module 150 may be ensured while the display module 150 is drawn out upward, and simultaneously, an area of the front surface may be utilized to the maximum. When the front cover 105 and the rear cover 102 have the same size, a lower space of the display module 150 may not be utilized, thereby reducing the size of an actually available screen.

For example, when the height of the front cover 105 is 60 cm and the height of the rear cover 102 is 70 cm, the size of the display module 150 may have a size corresponding to the size of the rear cover 102, and thus the display module 150 of 70 cm may be mounted and the size of the second region may correspond to 70 cm in the extension mode. Even when most of the display module 150 is exposed to the outside of the front cover 105, the rear cover 102 supports the rear cover 102, and thus an entire region of the display module 150 may be utilized.

When the heights of the front cover 105 and the rear cover 102 are the same at 60 cm, and about 10 cm of the display module 150 needs to be within the housing in consideration of the supporting force even when the maximum size of the display module 150 is 60 cm and the display module 150 is drawn out to the outside. Therefore, the size of an actual available screen is reduced to 50 cm.

When the heights of the front cover 105 and the rear cover 102 are formed at 70 cm, the size of the display module 150 may be 70 cm, but it is not possible to expose an entire portion of the display module 150 to the outside, and thus the size of an actually available screen is only 60 cm.

In the display device 100 in which the front cover 105 and the rear cover 102 have the same size, to obtain a screen with 70 cm in the extension mode, the size of the housing needs to be 80 cm. In this case, when a user sits on a sofa, the display device 100 is higher than an eye level, making it inconvenient to use the display device 100.

Therefore, when the rear cover 102 is larger than the front cover 105 as in the present disclosure, a screen having a size larger than the size of the front cover 105 may be provided.

The housings 105, 104, and 102 defining an outer appearance of the display device 100 may include the front cover 105 located on a front surface, the rear cover 102 located on a rear surface, and the side cover 104 defining a lateral surface. The front cover 105 and the rear cover 102 have different sizes, and thus a step difference may be formed between the front cover 105 and the rear cover 102, and a first opening through which the display module 150 is drawn in and out may be located at a position at which the step difference is formed.

When the display module 150 is completely inserted into the first opening, the first opening may be exposed, but the display module 150 according to the present disclosure may maintain a state of being inserted into the first opening, thereby minimizing an inflow of foreign substances through the first opening.

The display module according to the present disclosure may be drawn in and out of the housing according to the present disclosure, and thus when the display module 150 is not used (basic mode), the second region may be minimized to prevent a black screen from being exposed to the outside while the display module 150 is not used.

In the basic mode, environment information such as a clock, a temperature, and humidity may be output to the second region exposed at an upper portion to be easily checked by a user. When a notification is generated in a linked mobile terminal or home appliance, an icon for displaying the notification may be output.

When an alarm designated by the user is generated or an important notification is generated, the second region may be expanded and sufficient information may be provided to the user. The user may easily recognize occurrence of the notification through movement of the display module 150.

As illustrated in FIGS. 7 and 8, the front cover 105 may include a second opening 105a. A shape of the second opening may have a large size as shown in FIG. 2 and include a size for outputting information through the second opening or may obtain a lighting effect through a fine hole.

Although the second opening 105a is illustrated to have six circular shapes at an upper end thereof in FIG. 8, but this is merely an example. For example, the front cover 105 may further include the second opening 105a at a lower end, which is the same as the circular shape of the upper end. That is, the front cover 105 may include six circular second openings 105a at each of upper and lower ends thereof. When the front cover 105 includes the second opening 105a in at least one of the upper end or the lower end, when the front cover 105 moves up and down or the display 150 moves up and down, interference of sound output from an audio output unit 185 provided in the housing 10 may occur. This will be described below with reference to FIGS. 13 to 18.

Figure 9:
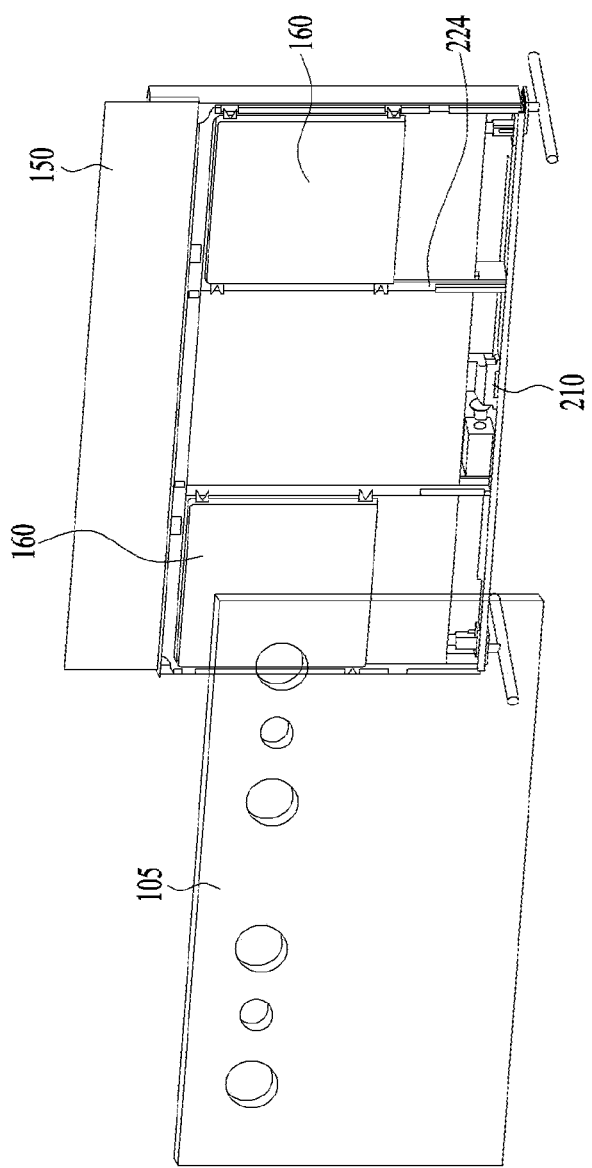
FIG. 9 is a diagram showing a front surface illustrating a state in which a front cover of a display device is removed, according to an embodiment of the present disclosure.

FIG. 9 is a diagram showing a front surface illustrating a state in which a front cover of a display device is removed, according to an embodiment of the present disclosure.

As illustrated in FIG. 9, an audio output unit 160 may be located on a front surface of the display module 150 to output sound through the second opening 105a.

Recently, as the thickness of the display device 100 becomes thinner, it tends to use a separate sound output device such as a sound bar or a home theater, but the sound output device occupies an indoor space, and it is difficult for a user to connect the sound output device, and thus inconvenience occurs when the user uses the sound output device.

The audio output unit located in a rear direction of the display device 100 is located opposite to the user, and thus the efficiency of sound output may be degraded, but the sound quality may be improved when the audio output unit is disposed to face the front surface as in the present disclosure.

To fix the audio output unit 160, the audio output unit 160 may be further included on a front surface of the display module 150, and to output surround sound, a pair of audio output units 160 may be provided on the left and the right as shown in FIG. 4, and when a woofer is further provided, the audio output unit 160 may be further placed in a lower portion of the center.

When only listening of music proceeds through the audio output unit 160, as shown in FIG. 7, in the basic mode in which the display module 150 is accommodated, an icon or information required for listening music may be output to the second region. For example, a title of the music being played and a name of a singer may be displayed or a cover image of an album may be displayed in the second region.

When the display module 150 is drawn out to the maximum as shown in FIG. 8, the display module 150 may move in accordance with an eye level of the user, and the size of the screen exposed to the outside may vary according to the size of the screen to be displayed.

In this case, the audio output unit 160 is located between the front cover 105 and the display module 150, and thus the sound output from the audio output unit 160 may vary while the front cover 105 moves.

In consideration of this, in FIGS. 11 and 12 to be described below, an embodiment in which a sound source and a sound level output from the audio output unit 160 are differently applied based on the movement of the front cover 105 will be described.

Figure 10:
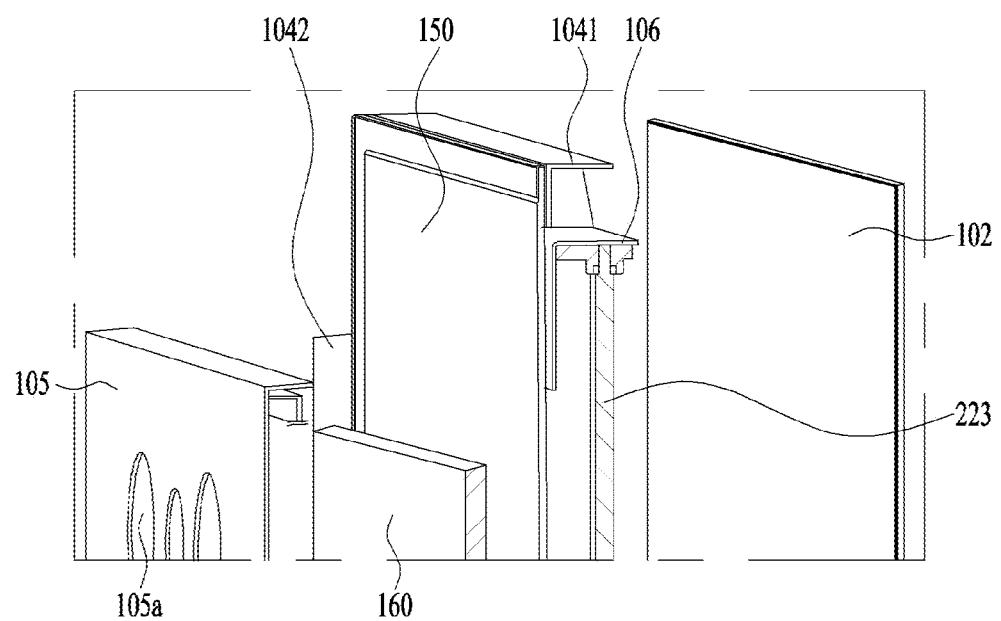
FIG. 10 is an exploded perspective view of a cross section of a display device taken along a line A-A of FIG. 7, according to an embodiment of the present disclosure.

FIG. 10 is an exploded perspective view of a cross section of a display device taken along a line A-A of FIG. 7, according to an embodiment of the present disclosure.

Referring to FIG. 10, the audio output unit 160 may be located between the front cover 105 and the display module 150, and an electronic component such as a circuit board and a driving integrated circuit (IC) as a controller for controlling the display module 150 and the audio output unit 160 may be mounted between the display module 150 and the rear cover 102.

The display device may further include the side cover 104 to ensure an installation space on a rear surface of the display module 150. The side cover 104 may include an upper cover 1041 located on a rear surface of the display module 150 and located above the rear cover 102, and a lateral cover 1042 located at the left and right sides of the display module 150.

The upper cover 1041 and the lateral cover 1042 may define an outer appearance of the display device 100 together with the front cover 105 and the rear cover 102. The upper cover 1041 and the lateral cover 1042 may be integrated with each other or may be configured by connecting straight covers.

The upper cover 1041 is located only on the rear surface of the display module 150, and thus the width of the upper cover 1042 is small, and as shown in FIG. 7, the length of the lateral cover 1042 in a rear direction corresponds to the size of the rear cover 102, and the length of the lateral cover 1042 in a front direction corresponds to the size of the front cover 105, and accordingly, a step difference may be formed at an upper portion of the lateral cover 1042.

Hereinafter, detailed embodiments of the display device described above will be described with reference to FIGS. 1 to 10.

That is, in the case of the display device in which the size of a display area exposed to the outside is changed, the location of the audio output unit is fixed, and thus the audio output unit is partially/temporarily covered by the front cover while the front cover or the display moves. Accordingly, distortion may occur in sound output of the audio output unit in a process of changing the size of the display area by exposing the display device to the outside.

The size of the display area exposed to the outside is changed by moving the front cover or the display, and thus noise of the motor is generated while the front cover or the display moves.

To resolve the above-described problem, the present disclosure describes an embodiment in which sound levels of sound output by an audio output unit are differently controlled or a sound source is changed while a front cover moves.

Hereinafter, the display device is described to determine a level of sound output by the audio output unit and a type of a sound source, but such an operation may be controlled by the above-described controller and each module. However, for convenience of description, the display device will be described to be performed.

Figure 11:
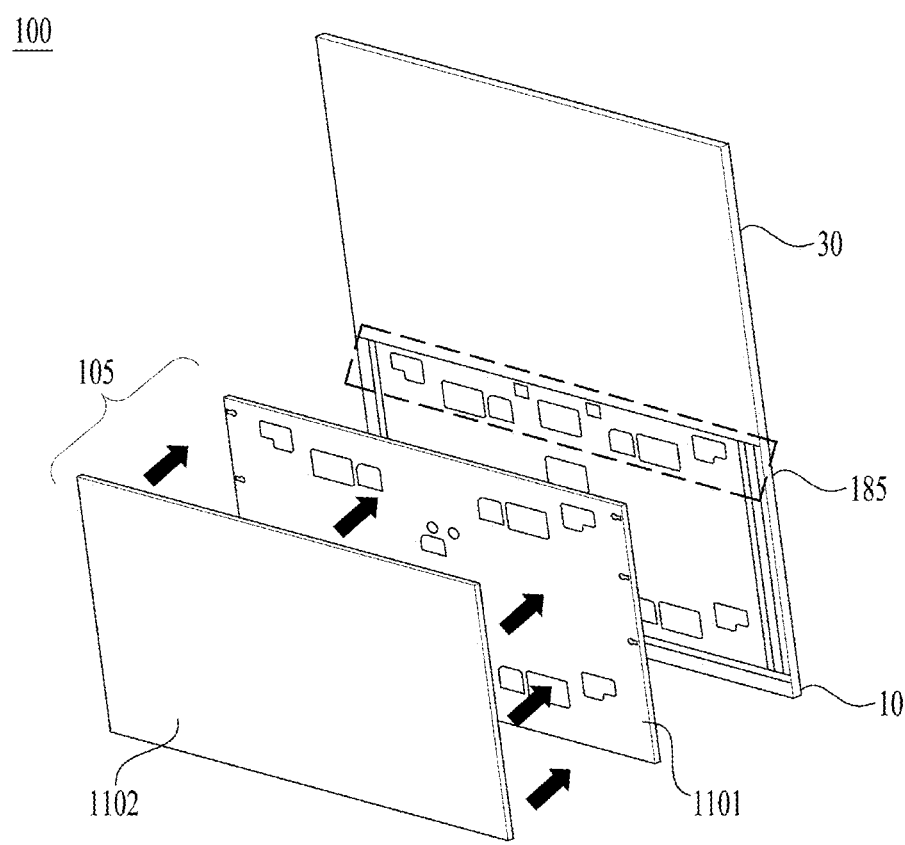
FIG. 11 is a diagram for explaining a structure of a cover and an audio output unit of a display device according to an embodiment of the present disclosure.

FIG. 11 is a diagram for explaining a structure of a cover and an audio output unit of a display device according to an embodiment of the present disclosure.

Referring to FIG. 11, the display device 100 may include the housing 10, the audio output unit 185, an injection cover 1101, an interior cover 1102, and a display 30. Here, the housing 10, the audio output unit 185, and the display 30 may be understood with reference to the drawings described above.

In this case, the housing 10 may correspond to a body on which electronic components such as various circuit boards and driving ICs are mounted, may fix the audio output unit 185 into the housing 10, and may fix or accommodate the display 30.

The injection cover 1101 and the interior cover 1102 may be combined with each other to define the front cover 105 described above in FIGS. 7 to 10.

Accordingly, the housing 10 may move the front cover 105 up and down by the embedded motor to expose a partial region or an entire region of the display area of the display 30 to the outside, or may move the display 30 up and down to expose a partial region or an entire region of the display area of the display 30 to the outside.

When the front cover 105 is moved up and down, the display 30 may be fixed to an upper end of the housing 10.

Similarly, when the display 30 is moved up and down, the front cover 105 may be attached to the housing 10. In this case, the display 30 may be lowered downward and accommodated in the housing 10.

The injection cover 1101 may be attached to the housing 10 to protect the display 30 or the audio output unit 185 accommodated in the housing 10. The audio output unit 185 may be fixedly installed to the housing 10 between the injection cover 1101 and the display 30.

The interior cover 1102 has a structure covering the injection cover 1101 and is exposed to the appearance, and thus the interior cover 1102 may include various materials for interior decoration. For example, the interior cover 1102 may be manufactured using a sheet such as synthetic fiber or wallpaper. That is, the interior cover 1102 is located at the outermost portion of the housing 10 and the front cover 105, and thus a user may not directly view the electronic component, and may use the display device as an interior product by using an interior material suitable for each home.

Although the interior cover 1102 of FIG. 11 is illustrated not to include an opening, when the interior cover 1102 includes an opening as shown in FIGS. 7 to 10, the interior cover 1102 and the injection cover 1101 may also be manufactured to include the openings of FIGS. 7 to 10.

Figure 12:
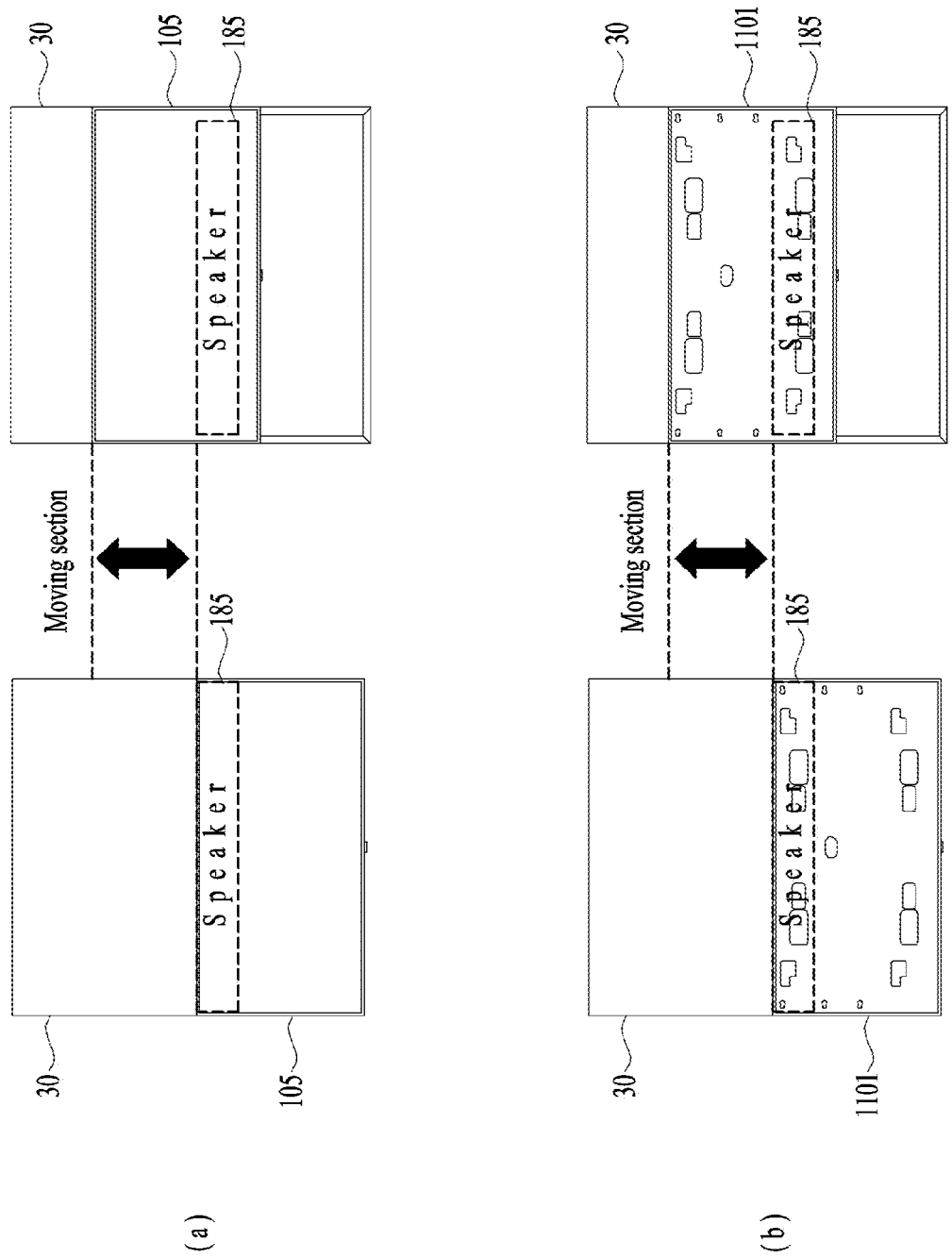
FIG. 12 is a diagram for explaining an operation of an audio output unit when a cover of a display device moves, according to an embodiment of the present disclosure.
Figure 13:
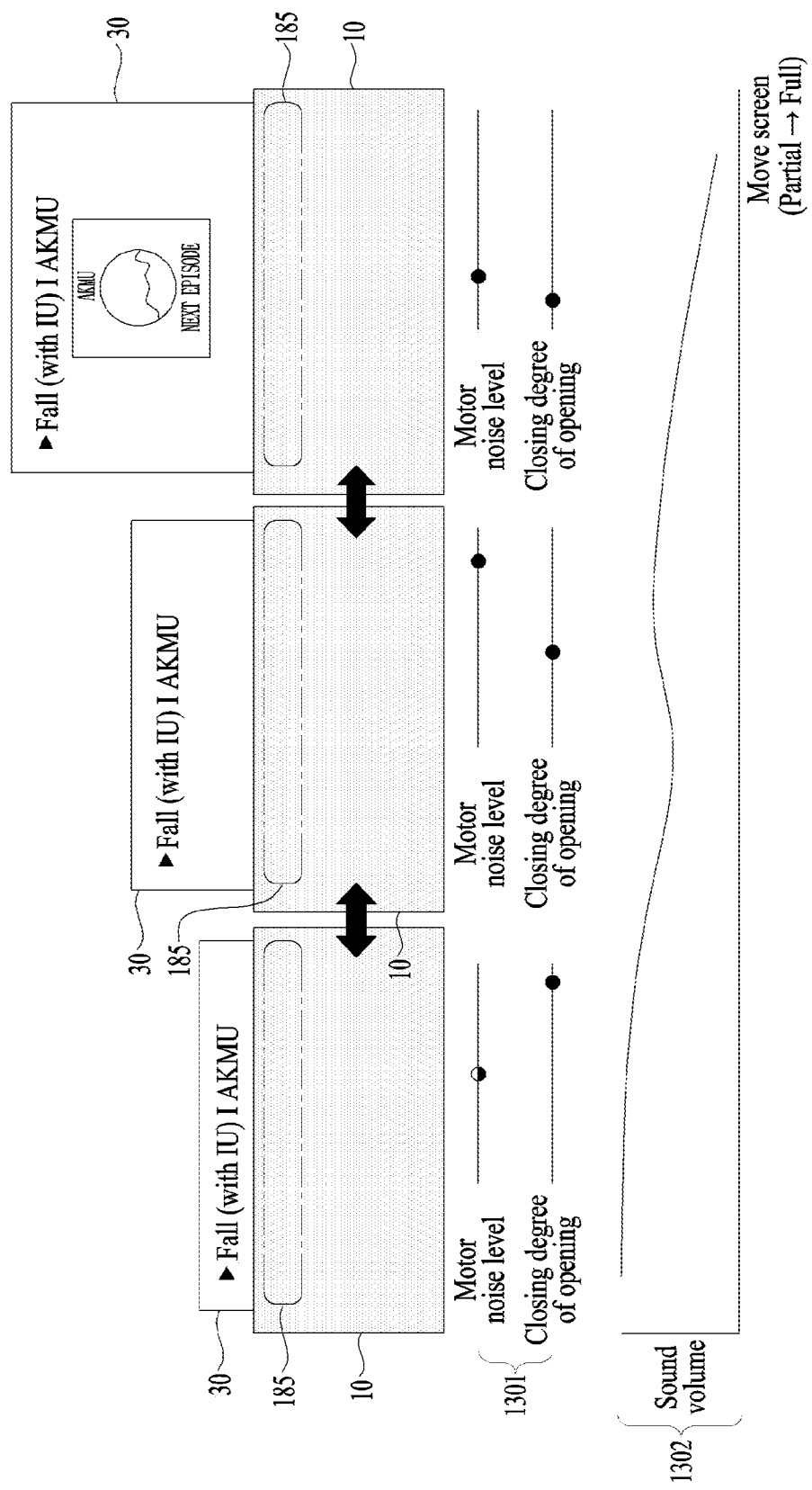
FIG. 13 is a diagram for explaining an operation of an audio output unit when a display of a display device moves according to an embodiment of the present disclosure.

In this case, FIG. 12 illustrates an embodiment in which a partial region or an entire region of a display area of a display is exposed to the outside by moving a front cover upward and downward directions by a motor will be described, and FIG. 13 illustrates an embodiment in which a partial region or an entire region of the display area of the display is exposed to the outside by moving the display in upward and downward directions by the motor.

FIG. 12 is a diagram for explaining an operation of an audio output unit when a cover of a display device moves, according to an embodiment of the present disclosure.

(a) of FIG. 12 illustrates an embodiment in which the front cover 105 including the interior cover of the display device of FIG. 11 moves upward and downward, and (b) of FIG. 12 illustrates an embodiment in which the injection cover 1101 except for the interior cover of the display device of FIG. 11 moves upward and downward.

Referring to (a) of FIG. 12, a left diagram of (a) of FIG. 12 shows a state in which an entire region of a display area of the display 30 is exposed to the outside (e.g. full view) by moving the front cover 105 of the display device downward, and a right diagram of (b) of FIG. 12 shows a state (e.g. partial view) in which only a partial region of the display area of the display 30 is exposed to the outside by moving the front cover 105 of the display device upward.

In this case, in an embodiment of the present disclosure, the audio output unit 185 of the display device may be fixed to a preset area of a housing (not shown). In more detail, the audio output unit 185 may be located at a lower end of the display 30 supported by the housing. The audio output unit 185 may be fixed to the lower end of the display 30 even if the front cover 105 is moved up and down by a motor (not shown). The audio output unit 185 may be located in a space between the front cover 105 and the display 30.

Accordingly, when the display device outputs a sound corresponding to content that is currently output from the display 30 while moving the front cover 105, even if the audio output unit 185 outputs a fixed sound level, a user may listen to another sound due to movement of the front cover 105.

To compensate for this, in an embodiment of the present disclosure, while the front cover 105 moves, the display device may control a level of sound output by the audio output unit 185 based on a moving speed of the front cover 105. For example, the display device may differently control a level of sound output by the audio output unit 185 based on a movement start speed, a moving intermediate speed, and a moving end speed of the front cover 105.

In more detail, in a first state in which an entire region of the display area of the display 30 is exposed to the outside as shown in a left drawing of (a) of FIG. 12, when the front cover 105 moves in a second state in which a partial region of the display area is exposed to the outside, as shown in a right drawing of (a) of FIG. 12, the display device may greatly control a level of sound output by the audio output unit 185. For example, while a music video is viewed in the entire region in the first state, the display device receives a signal for switching the first state to the second state (e.g., a signal for pressing a button of the remote control device described above), the display device may greatly control a level of sound output by the audio output unit 185 by moving the front cover 105 upward.

Similarly, when the front cover 105 moves from the second state to the first state, the display device may control the level of sound output by the audio output unit 185 to be low. Accordingly, even when the front cover 105 moves up and down, the user watching content output to the display 30 by the display device may appreciate the sound of the content without being affected by the intensity of the sound output by the audio output unit 185.

In an embodiment of the present disclosure, the display device may control a level of sound output by the audio output unit 185 based on a position change of the front cover 105 with respect to the audio output unit 185 while the front cover 105 moves up or down. In more detail, the audio output unit 185 is fixed to the housing, and thus the position of the front cover 105 with respect to the audio output unit 185 changes as the front cover 105 moves up and down. Accordingly, the display device may control the sound output by the audio output unit 185.

In an embodiment of the present disclosure, the display device may change a type of sound source output by the audio output unit 185 based on the content that is currently output in the display area of the display 30 while the front cover 105 moves up or down. For example, when the content that is currently output from the display 30 is a content that does not output sound, the display device may output a monotonous sound source through the audio output unit 185 to hide noise of the motor.

When the content that is currently output from the display 30 is content that currently outputs sound, the display device may change and output the existing output sound to cover the noise of the motor. In this case, the display device may apply an algorithm for monotonically changing the existing output sound. Such an algorithm may be applied through an external server or by monotonously changing a frequency of a sound source through a controller in the display device.

This is because, in the case of music with loud sound output from the display 30, the noise of the motor generated while the front cover 105 moves may be heard louder, and thus the display device may monotonously change and output a sound by reducing the width of a frequency of loud music that is pre-output only while the front cover 105 moves.

Referring to (b) of FIG. 12, a left diagram of (b) of FIG. 12 shows a state in which an entire region of the display area of the display 30 is exposed to the outside (e.g. full view) by moving the injection cover 1101 of the display device downward, and a right diagram of (a) of FIG. 12 shows a state in which only a partial region of the display area of the display 30 is exposed to the outside (e.g. a partial view) by moving the injection cover 1101 of the display device upward. (b) of FIG. 12 is a detailed diagram of the position of the audio output unit 185 fixed to the injection cover 1101 from which the interior cover is removed, and an embodiment applied to (b) of FIG. 12 is the same as (a) of FIG. 12.

Although FIG. 12 illustrates the case in which the front cover 105 and the injection cover 1101 do not include an opening, the front cover 105 and the injection cover 1101 of FIG. 12 may include at least one opening as illustrated in FIGS. 7 to 10. When an opening is included in the front cover 105 and the injection cover 1101, sound output from the audio output unit 185 may be output differently depending on a relative position between the front cover 105, the injection cover 1101, and the audio output unit 185. This will be described in detail with reference to FIGS. 13 to 18.

Although FIG. 12 illustrates an embodiment in which the front cover 105 or the injection cover 1101 moves upward or downward to expose a partial region or an entire region of the display area of the display 30 by the display device, the display 30 itself may move upward and downward to expose the partial region or the entire region of the display area of the display 30 to the outside. This will be described in more detail with reference to FIG. 13.

FIG. 13 is a diagram for explaining an operation of an audio output unit when a display of a display device moves according to an embodiment of the present disclosure.

Referring to FIG. 13, unlike FIG. 12, the display device may move the display 30 accommodated in the housing 10 upward and downward to control a partial region or an entire region of the display area of the display 30 to be exposed to the outside. In this case, the display 30 may move up and down through the opening of an upper end of the housing 10.

A first diagram of FIG. 13 shows the first state in which the display 30 is located at the lowest position of the housing 10 and only a minimum region of the display area is exposed to the outside, a second diagram of FIG. 13 shows the second state of a process in which the display 30 is exposed out of the housing 10, and a third diagram of FIG. 13 shows a third state in which the display 30 is located at the uppermost position of the housing 10 and the maximum region of the display area is exposed to the outside.

Referring to the first to third diagrams of FIG. 13, the display device may move the display 30 accommodated in the housing 10 up and down according to a selected mode or a received signal. In this case, the display device may move the display 30 up and down by using a motor included in the housing 10, and in this case, the audio output unit 185 is fixed inside the housing 10.

A first plot 1301 of FIG. 13 shows a noise level of a motor and a closing degree of an opening, generated in a process in which a display device moves the display 30 to the third state from the first state.

In more detail, referring to the first plot 1301, the first state is a state in which a noise level of the motor is intermediate when the display 30 starts moving, and the display 30 is accommodated in the housing 10, and thus a space between the display 30 and a front cover of the housing 10 is narrow, and thus a closing degree of the opening of the upper end of the housing 10 in which the audio output unit 185 is capable of outputting sound is high.

In the second state, the display 30 moves in the first state or the third state, a noise level of the motor is high, and the display 30 is accommodated in the middle portion of the housing 10, and thus a closing degree of the opening of the upper end of the housing 10 in which the audio output unit 185 is capable of outputting sound is intermediate.

In the third state, the display 30 ends movement thereof, a noise level of the motor is low, and the display 30 is located outside the housing 10, and thus there is almost no space in which the display 30 and the front cover of the housing 10 overlap each other, and accordingly, a closing degree of the opening of the upper end of the housing 10, by which the audio output unit 185 is capable of outputting sound, is low.

A second plot 1302 of FIG. 13 illustrates an embodiment in which the display device controls a sound volume of the audio output unit 185 while the display device moves the display 30 to the third state from the first state.

Based on the first plot 1301 of FIG. 13, the display device may control a sound volume of the audio output unit 185 based on each state.

In more detail, the first state is a state in which a noise level of the motor is intermediate and a closing degree of the opening is high, and thus the display device may set a sound volume output by the audio output unit 185 to be high. The second state is a state in which the noise level of the motor is high and the closing degree of the opening is intermediate, and thus the display device may set the sound volume output by the audio output unit 185 to be intermediate. The third state is a state in which the noise level of the motor is low and the closing degree of the opening is low, and thus the display device may set the sound volume output by the audio output unit 185 to be low.

That is, the display device may control the intensity of the sound volume output by the audio output unit 185 in consideration of the noise level of the motor, generated while the display device moves the display 30 up and down, and a closing degree of the opening of the housing 10, which changes while the display 30 moves into and out of the housing 10.

In this case, FIG. 13 illustrates an example of a noise level of the motor and a closing degree of the opening, and as described above, the display device may control the sound volume output by the audio output unit 185 based on a moving speed of the display 30.

Similarly, the display device may change a type of a sound source output by the audio output unit 185 based on content that is currently output in the display area of the display 30 while the display 30 moves up and down. In this case, the display device may change the characteristic (e.g. a frequency) of the sound source.

Figure 14:
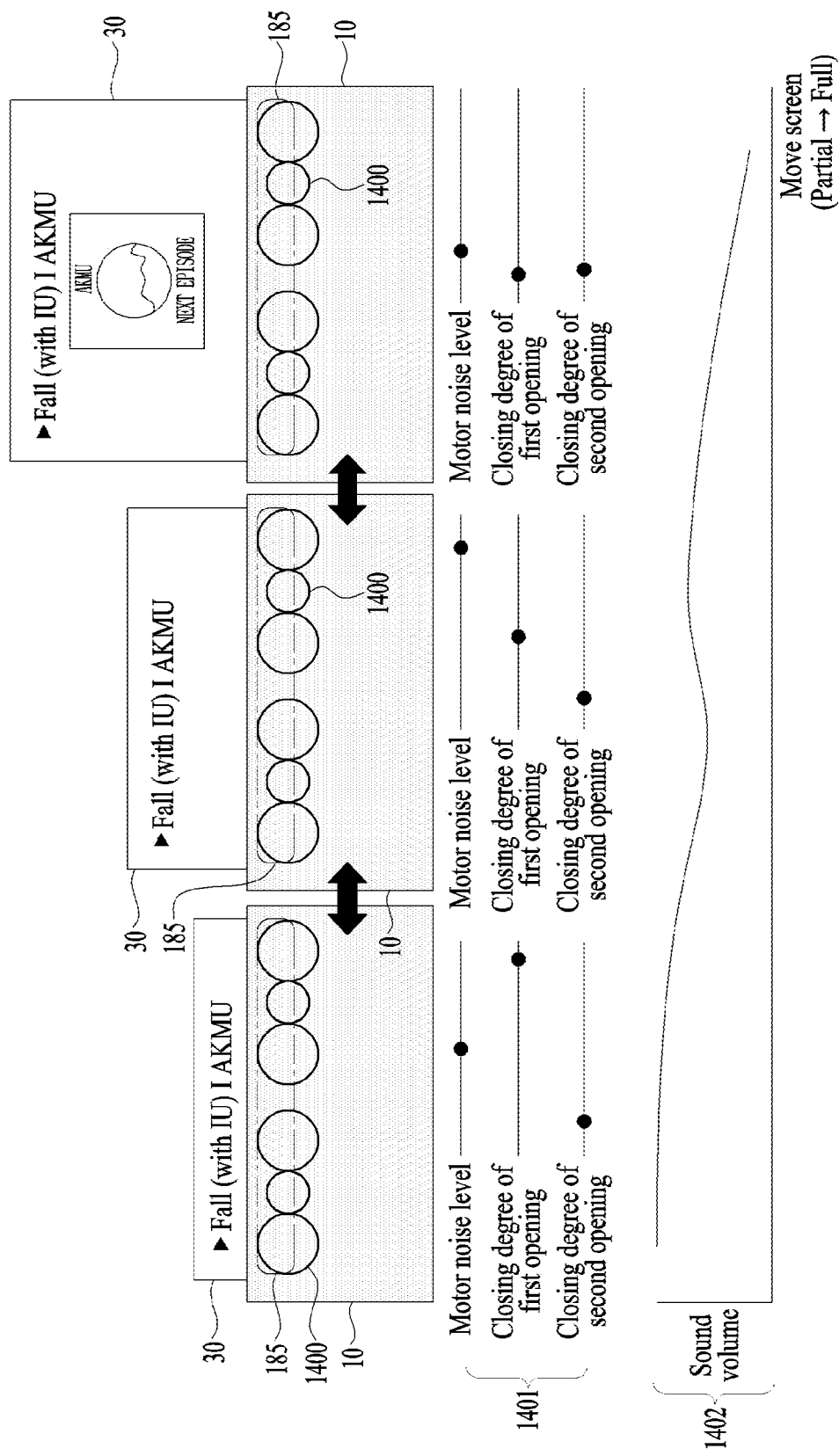
FIG. 14 is a diagram illustrating an operation of an audio output unit when a display of a display device moves according to another embodiment of the present disclosure.

FIG. 14 is a diagram illustrating an operation of an audio output unit when a display of a display device moves according to another embodiment of the present disclosure. Hereinafter, a repeated description of FIG. 13 will be omitted.

Unlike FIG. 13, FIG. 14 illustrates an embodiment in which the front cover of the housing 10 includes at least one second opening 1400.

Referring to FIG. 14, the display device may move the display 30 up and down through the first opening of the upper end of the housing 10, which corresponds to a state in which the audio output unit 185 is fixed to the housing 10.

In this case, although the audio output unit 185 is fixed to the housing 10, at least one second opening 1400 exists in the front cover, and thus sound output by the audio output unit 185 may be output through the first opening or the second opening 1400 of the front cover in which the display 30 moves.

A first plot 1401 of FIG. 14 illustrates a noise level of the motor and closing degrees of the first opening and the second opening, generated when the display device moves the display 30 from the first state to the third state.

In more detail, referring to the first plot 1401, the first state is a state in which the display 30 starts moving, a noise level of the motor is intermediate, and the display 30 is accommodated in the housing 10, and thus a space between the display 30 and the front cover of the housing 10 is narrow and a closing degree of the first opening of the upper end of the housing 10 in which the audio output unit 185 is capable of outputting sound is high. The second opening 1400 included in the front cover is located at the same position as the audio output unit 185, and thus a closing degree of the second opening 1400 is low.

The second state is a state in which the display 30 currently moves in the first state or the third state and a noise level of the motor is high, and the display 30 is accommodated in a middle portion of the housing 10, and thus a closing degree of the first opening of the upper end of the housing 10 in which the audio output unit 185 is capable of outputting sound is intermediate. The second opening 1400 included in the front cover is located at the same position as the audio output unit 185, and thus a closing degree of the second opening 1400 is low.

The third state is a state in which the display 30 ends movement thereof, a noise level of the motor is low, and the display 30 is located outside the housing 10, and thus there is almost no space in which the display 30 and the front cover of the housing 10 overlap each other, and accordingly, a closing degree of the first opening of the upper end of the housing 10, by which the audio output unit 185 is capable of outputting sound, is low. The second opening 1400 included in the front cover is located at the same position as the audio output unit 185, and thus a closing degree of the second opening is low.

A second plot 1402 of FIG. 14 illustrates an embodiment in which the display device controls a sound volume of the audio output unit 185 while the display device moves the display 30 from the first state to the third state.

Based on the first plot 1401 of FIG. 14, the display device may control a sound volume of the audio output unit 185 based on each state.

In more detail, the first state is a state in which a noise level of the motor is intermediate, a closing degree of the first opening is high, and a closing degree of the second opening is low, and thus the display device may set a sound volume output by the audio output unit 185 to be high. The second state is a state in which the noise level of the motor is high, the closing degree of the first opening is intermediate, and the closing degree of the second opening is low, and thus the display device may set the sound volume output by the audio output unit 185 to be intermediate. The third state is a state in which the noise level of the motor is low, the closing degree of the first opening is low, and the closing degree of the second opening is low, and thus the display device may set the sound volume output by the audio output unit 185 to be low.

That is, the display device may control the intensity of the sound volume output by the audio output unit 185 in consideration of the noise level of the motor, generated while the display device moves the display 30 up and down, and a closing degree of the first opening of the housing 10 and a closing degree of the second opening, which change while the display 30 moves into and out of the housing 10.

Figure 15:
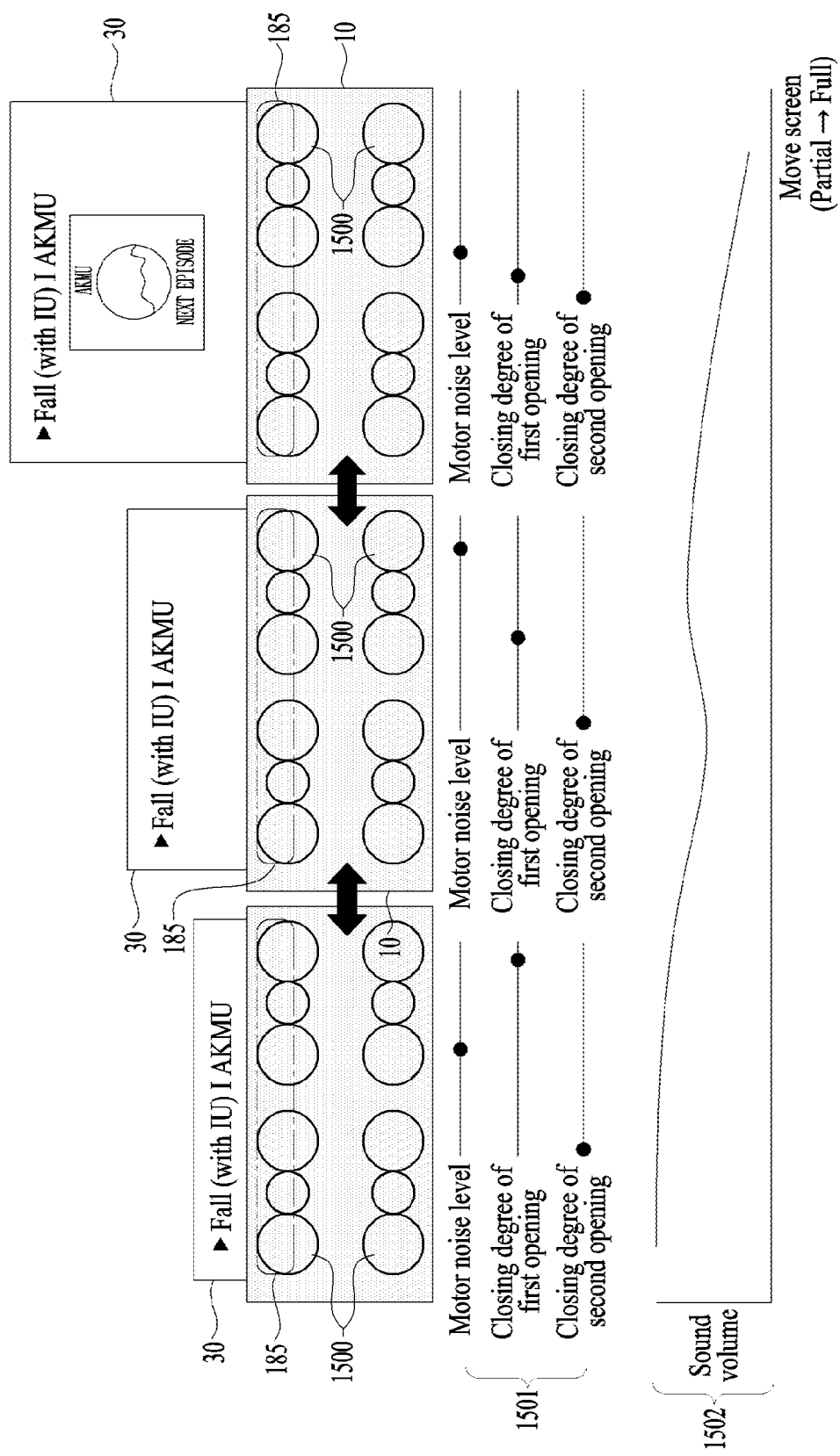
FIG. 15 is a diagram for explaining an operation of an audio output unit when a display of a display device moves, according to another embodiment of the present disclosure.

FIG. 15 is a diagram for explaining an operation of an audio output unit when a display of a display device moves, according to another embodiment of the present disclosure. Hereinafter, a repeated description of FIGS. 13 and 14 will be omitted repeated.

Unlike FIGS. 13 and 14, FIG. 15 illustrates an embodiment in which the front cover of the housing 10 includes at least one second opening 1400 at an upper end and a lower end thereof.

Referring to FIG. 15, the display device may move the display 30 up and down through the first opening of the upper end of the housing 10, which corresponds to a state in which the audio output unit 185 is fixed to the housing 10.

In this case, although the audio output unit 185 is fixed to the housing 10, at least one second opening 1500 exists at an upper end and a lower end of the front cover, and thus sound output by the audio output unit 185 may be output through the first opening or the second opening 1500 of the front cover, in which the display 30 moves.

A first plot 1501 of FIG. 15 shows a noise level of a motor and a closing degree of an opening, generated in a process in which a display device moves the display 30 to the third state from the first state.

In more detail, referring to the first plot 1501, the first state is a state in which a noise level of the motor is intermediate when the display 30 starts moving, and the display 30 is accommodated in the housing 10, and thus a space between the display 30 and a front cover of the housing 10 is narrow, and thus a closing degree of the opening of the upper end of the housing 10 in which the audio output unit 185 is capable of outputting sound is high. A portion of an upper end of the second opening 1500 included in the front cover is located at the same position as the audio output unit 185, and thus a closing degree of the second opening 1500 is low.

The second state is a state in which the display 30 currently moves in the first state or the third state and a noise level of the motor is high, and the display 30 is accommodated in a middle portion of the housing 10, and thus a closing degree of the first opening of the upper end of the housing 10 in which the audio output unit 185 is capable of outputting sound is intermediate. A portion of an upper end of the second opening 1400 included in the front cover is located at the same position as the audio output unit 185, and thus a closing degree of the second opening is low.

The third state is a state in which the display 30 ends movement thereof, a noise level of the motor is low, and the display 30 is located outside the housing 10, and thus there is almost no space in which the display 30 and the front cover of the housing 10 overlap each other, and accordingly, a closing degree of the first opening of the upper end of the housing 10, by which the audio output unit 185 is capable of outputting sound, is low. The second opening 1400 included in the front cover is located at the same position as the audio output unit 185, and thus a closing degree of the second opening is low A second plot 1502 of FIG. 15 illustrates an embodiment in which the display device controls a sound volume of the audio output unit 185 while the display device moves the display 30 from the first state to the third state.

Based on the first plot 1501 of FIG. 15, the display device may control a sound volume of the audio output unit 185 based on each state.

In more detail, the first state is a state in which a noise level of the motor is intermediate, a closing degree of the first opening is high, and a closing degree of the second opening is low, and thus the display device may set a sound volume output by the audio output unit 185 to be high. The second state is a state in which the noise level of the motor is high, the closing degree of the first opening is intermediate, and the closing degree of the second opening is low, and thus the display device may set the sound volume output by the audio output unit 185 to be intermediate. The third state is a state in which the noise level of the motor is low, the closing degree of the first opening is low, and the closing degree of the second opening is low, and thus the display device may set the sound volume output by the audio output unit 185 to be low.

That is, the display device may control the intensity of the sound volume output by the audio output unit 185 in consideration of the noise level of the motor, generated while the display device moves the display 30 up and down, and a closing degree of the first opening of the housing 10 and a closing degree of the second opening, which change while the display 30 moves into and out of the housing 10.

Figure 16:
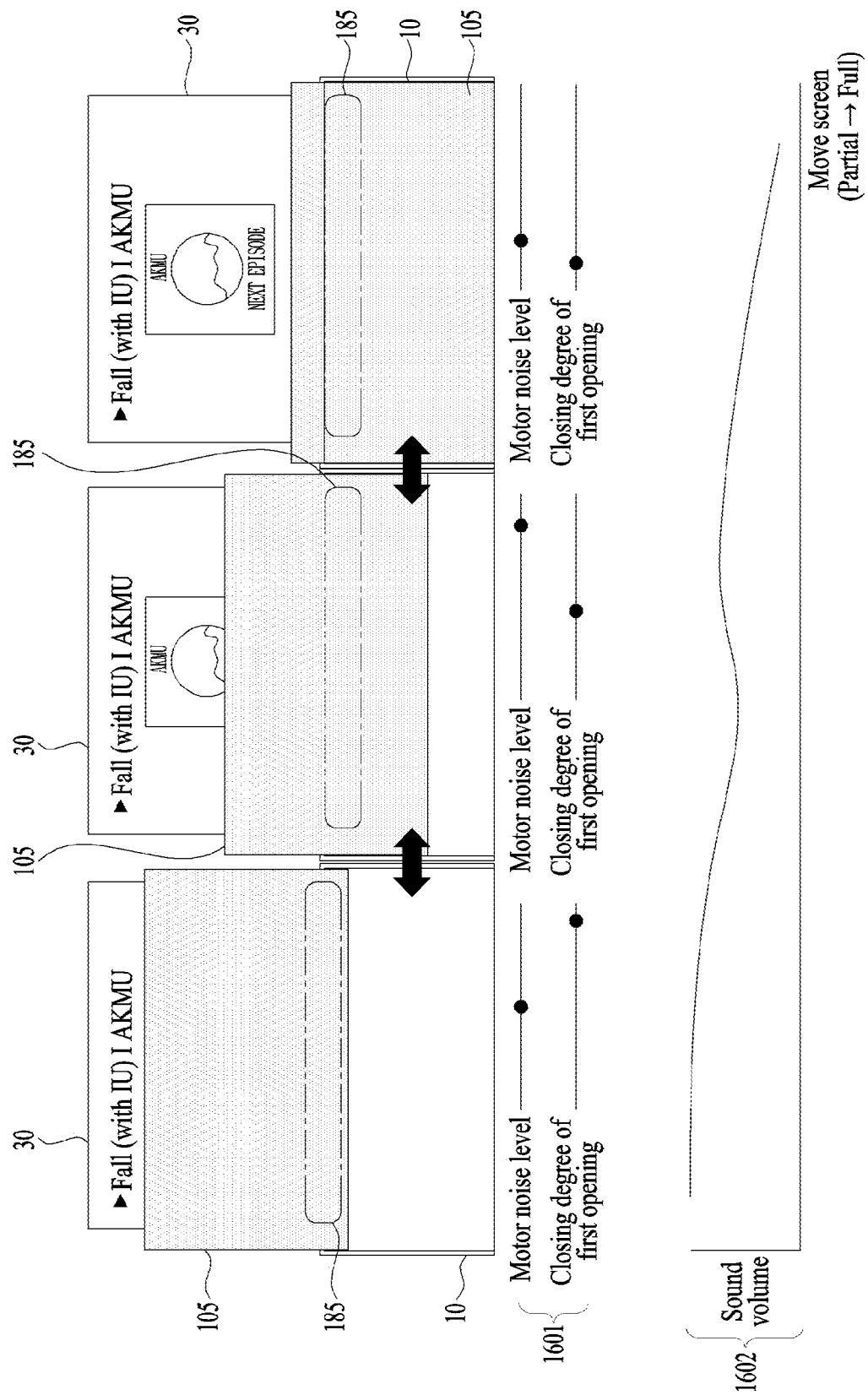
FIG. 16 is a diagram for explaining an operation of an audio output unit when a cover of a display device moves, according to another embodiment of the present disclosure.

FIG. 16 is a diagram for explaining an operation of an audio output unit when a cover of a display device moves, according to another embodiment of the present disclosure. Hereinafter, a repeated description of FIGS. 13 to 15 will be omitted repeated.

Unlike FIGS. 13 to 15, referring to FIG. 16, the display device may control a partial region or an entire region of the display area of the display 30, exposed to the outside by moving the front cover 105 upward and downward instead of moving the display 30 to the outside, to be exposed to the outside.

A first diagram of FIG. 16 shows the first state in which the front cover 105 is positioned at the uppermost position of the housing 10 and only a minimum region of the display area is exposed to the outside, a second diagram of FIG. 16 shows the second state in which the front cover 105 moves downward to expose the display 30 to the outside, and a third diagram of FIG. 16 shows the third state in which an entire region of the display area of the display 30 is exposed to the outside and the front cover 105 is located at the lowermost position of 10.

Referring to the first to third diagrams of FIG. 16, the display device may move the front cover 105 up and down according to a selected mode or a received signal. In this case, the display device may move the front cover 105 up and down using a motor included in the housing 10, and in this case, the audio output unit 185 is fixed inside the housing 10.

A first plot 1601 of FIG. 16 shows a noise level of a motor and a closing degree of an opening, generated in a process in which a display device moves the front cover 105 to the third state from the first state.

In more detail, referring to the first plot 1601, the first state is a state in which a noise level of the motor is intermediate when the front cover 105 starts moving, and the front cover 105 and the display 30 close both sides of the audio output unit 185, and thus a closing degree of the opening of the upper end of the housing 10 in which the audio output unit 185 is capable of outputting sound is high.

The second state is a state in which the front cover 105 moves in the first state or the third state and a noise level of the motor is high, and the front cover 105 is accommodated in the middle portion of the housing 10, and thus a closing degree of the opening of the upper end of the housing 10 in which the audio output unit 185 is capable of outputting sound is intermediate.

The third state is a state in which the front cover 105 ends moving, a noise level of the motor is low, the front cover 105 is located at the lowermost position, and the display 30 is located at the uppermost position, and thus there is almost no space in which the front cover 105 and the display 30 overlap each other, and accordingly, a closing degree of the opening of the upper end of the housing 10, by which the audio output unit 185 is capable of outputting sound, is low.

A second plot 1602 of FIG. 16 illustrates an embodiment in which the display device controls a sound volume of the audio output unit 185 while the front cover 105 moves to the third state from the first state.

Based on the first plot 1601 of FIG. 16, the display device may control a sound volume of the audio output unit 185 based on each state.

In more detail, the first state is a state in which a noise level of the motor is intermediate and a closing degree of the opening is high, and thus the display device may set a sound volume output by the audio output unit 185 to be high. The second state is a state in which the noise level of the motor is high and the closing degree of the opening is intermediate, and thus the display device may set the sound volume output by the audio output unit 185 to be intermediate. The third state is a state in which the noise level of the motor is low and the closing degree of the opening is low, and thus the display device may set the sound volume output by the audio output unit 185 to be low.

That is, the display device may control the intensity of the sound volume output by the audio output unit 185 in consideration of the noise level of the motor, generated while the front cover 105 moves up and down, and closing degrees of openings of the front cover 105, the display 30, and the housing 10, which change while the front cover 105 moves above and below the housing 10.

In this case, FIG. 16 illustrates an example of a noise level of the motor and a closing degree of the opening, and as described above, the display device may control the sound volume output by the audio output unit 185 based on a moving speed of the front cover 105.

Similarly, the display device may change a type of a sound source output by the audio output unit 185 based on content that is currently output in the display area of the display 30 while the front cover 105 moves up and down. In this case, the display device may change the characteristic (e.g. a frequency) of the sound source.

Figure 17:
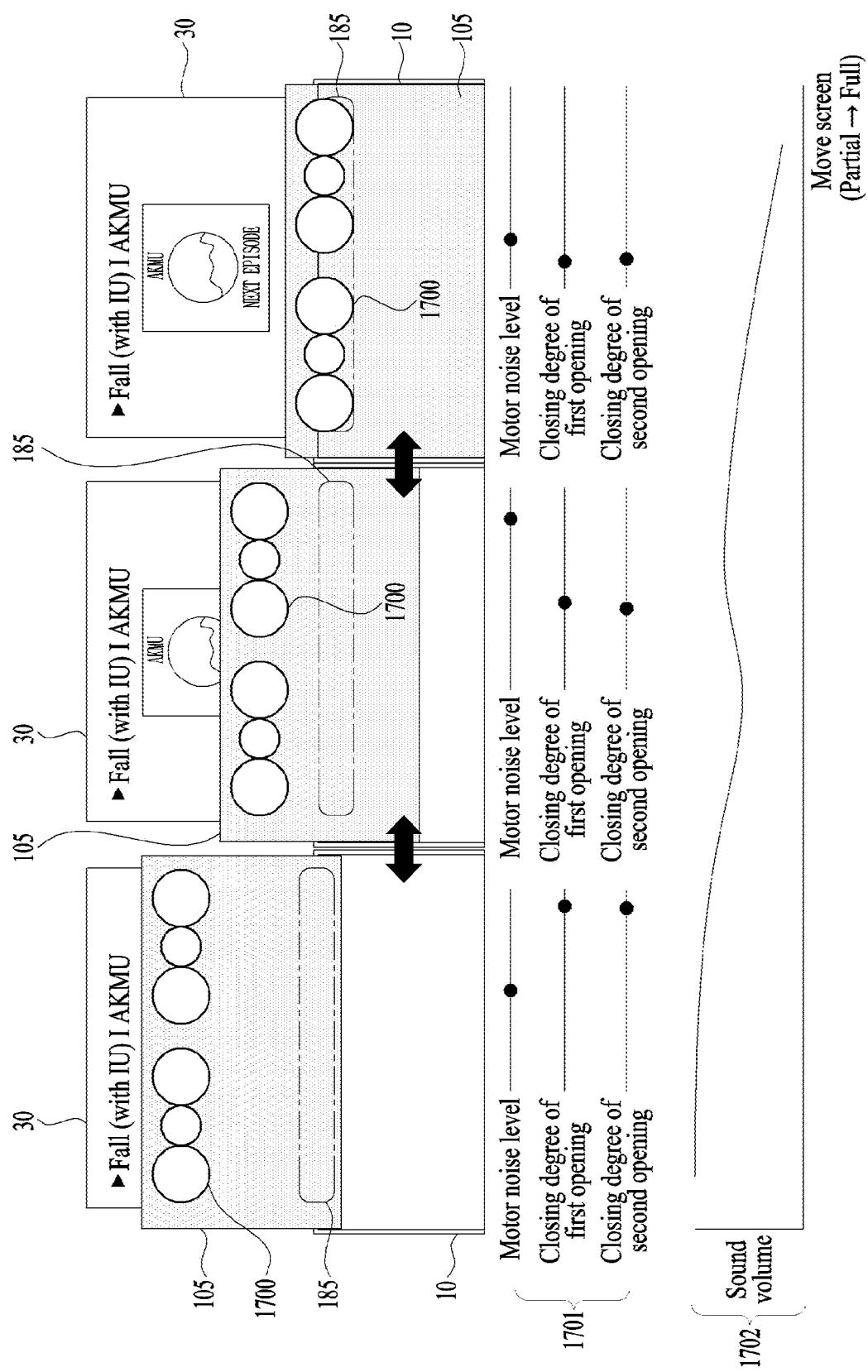
FIG. 17 is a diagram illustrating an operation of an audio output unit when a cover of a display device moves according to another embodiment of the present disclosure.

FIG. 17 is a diagram illustrating an operation of an audio output unit when a cover of a display device moves according to another embodiment of the present disclosure. Hereinafter, a repeated description of FIGS. 13 to 16 will be omitted.

Unlike FIG. 16, FIG. 17 illustrates an embodiment in which the front cover 105 includes at least one second opening 1700.

Referring to FIG. 17, the display device may control the front cover 105 to be moved up and down to expose a partial region or an entire region of the display 30, which corresponds to a state in which the audio output unit 185 is fixed to the housing 10.

In this case, although the audio output unit 185 is fixed to the housing 10, at least one second opening 1700 exists in the front cover 105, and thus sound output by the audio output unit 185 may be output through the first opening or the second opening 1700 of the front cover 105 between the display 30 and the housing 10.

A first plot 1701 of FIG. 17 shows a noise level of a motor and closing degrees of a first opening and a second opening, generated in a process in which a display device moves the front cover 105 to the third state from the first state.

In more detail, referring to the first plot 1701, the first state is a state in which a noise level of the motor is intermediate when the front cover 105 starts moving, and the front cover 105 and the display 30 close both sides of the audio output unit 185, and thus a closing degree of a first opening of the upper end of the housing 10 in which the audio output unit 185 is capable of outputting sound is high. The second opening 1700 included in the front cover 105 is farthest from the audio output unit 185, and thus a closing degree of the second opening 1700 is high.

The second state is a state in which the front cover 105 moves in the first state or the third state and a noise level of the motor is high, and the front cover 105 is accommodated in the middle portion of the housing 10, and thus a closing degree of the first opening of the upper end of the housing 10 in which the audio output unit 185 is capable of outputting sound is intermediate. The second opening 1700 included in the front cover 105 is close to the audio output unit 185, and thus a closing degree of the second opening 1700 is intermediate.

The third state is a state in which the front cover 105 ends moving, a noise level of the motor is low, the front cover 105 is located at the lowermost position, and the display 30 is located at the uppermost position, and thus there is almost no space in which the front cover 105 and the display 30 overlap each other, and accordingly, a closing degree of the first opening of the upper end of the housing 10, by which the audio output unit 185 is capable of outputting sound, is low. The second opening 1700 included in the front cover 105 is closest to the audio output unit 185, and thus a closing degree of the second opening 1700 is low.

A second plot 1702 of FIG. 17 illustrates an embodiment in which the display device controls a sound volume of the audio output unit 185 while the front cover 105 moves to the third state from the first state.

Based on the first plot 1701 of FIG. 17, the display device may control a sound volume of the audio output unit 185 based on each state.

In more detail, the first state is a state in which a noise level of the motor is intermediate a closing degree of the first opening is high, and a closing degree of the second opening is high, and thus the display device may set a sound volume output by the audio output unit 185 to be high. The second state is a state in which the noise level of the motor is high, a closing degree of the first opening is intermediate, and a closing degree of the second opening is high, and thus the display device may set the sound volume output by the audio output unit 185 to be intermediate. The third state is a state in which the noise level of the motor is low, a closing degree of the first opening is low, and a closing degree of the second opening is low, and thus the display device may set the sound volume output by the audio output unit 185 to be low.

That is, the display device may control the intensity of the sound volume output by the audio output unit 185 in consideration of the noise level of the motor, generated while the front cover 105 moves up and down, and a closing degree of the first opening between the display 30 and the housing 10 and a closing degree of the second opening between the front cover 105 and the audio output unit 185, which change while the front cover 105 moves above and below the housing 10.

FIG. 18 is a diagram illustrating an operation of an audio output unit when a cover of a display device moves according to another embodiment of the present disclosure. Hereinafter, a repeated description of FIGS. 13 to 17 will be omitted.

Unlink FIGS. 16 and 17, FIG. 18 illustrates an embodiment in which the front cover 105 includes at least one second opening 1800 in an upper end and a lower end thereof.

Referring to FIG. 18, the display device may control the front cover 105 to be moved up and down to expose a partial region or an entire region of the display 30, which corresponds to a state in which the audio output unit 185 is fixed to the housing 10.

In this case, although the audio output unit 185 is fixed to the housing 10, at least one second opening 1800 exists in each of an upper end and a lower end of the front cover 105, and thus sound output by the audio output unit 185 may be output through the first opening between the display 30 and the housing 10 or the second opening 1800 in the upper end and the lower end of the front cover 105.

A first plot 1801 of FIG. 18 shows a noise level of a motor and closing degrees of a first opening and a second opening, generated in a process in which a display device moves the front cover 105 to the third state from the first state.

In more detail, referring to the first plot 1801, the first state is a state in which a noise level of the motor is intermediate when the front cover 105 starts moving, and the front cover 105 and the display 30 close both sides of the audio output unit 185, and thus a closing degree of a first opening of the upper end of the housing 10 in which the audio output unit 185 is capable of outputting sound is high. The second opening 1800 provided in a lower end among the second openings 1800 included in the front cover 105 is located at the same position as the audio output unit 185, and thus a closing degree of the second opening is low.

The second state is a state in which the front cover 105 moves in the first state or the third state and a noise level of the motor is high, and the front cover 105 is located in the middle portion of the housing 10, and thus a closing degree of the first opening of the upper end of the housing 10 in which the audio output unit 185 is capable of outputting sound is intermediate. The second opening 1800 in the upper end and the lower end included in the front cover 105 becomes close to the audio output unit 185, and thus a closing degree of the second opening is intermediate.

The third state is a state in which the front cover 105 ends moving, a noise level of the motor is low, the front cover 105 is located at the lowermost position, and the display 30 is located at the uppermost position, and thus there is almost no space in which the front cover 105 and the display 30 overlap each other, and accordingly, a closing degree of the first opening of the upper end of the housing 10, by which the audio output unit 185 is capable of outputting sound, is low. The second opening 1700 included in a lower end of the front cover 105 is located at the same position as the audio output unit 185, and thus a closing degree of the second opening is low.

A second plot 1802 of FIG. 18 illustrates an embodiment in which the display device controls a sound volume of the audio output unit 185 while the front cover 105 moves to the third state from the first state.

Based on the first plot 1801 of FIG. 18, the display device may control a sound volume of the audio output unit 185 based on each state.

In more detail, the first state is a state in which a noise level of the motor is intermediate a closing degree of the first opening is high, and a closing degree of the second opening is high, and thus the display device may set a sound volume output by the audio output unit 185 to be low. The second state is a state in which the noise level of the motor is high, a closing degree of the first opening is intermediate, and a closing degree of the second opening is intermediate, and thus the display device may set the sound volume output by the audio output unit 185 to be slightly high. The third state is a state in which the noise level of the motor is low, a closing degree of the first opening is low, and a closing degree of the second opening is low, and thus the display device may set the sound volume output by the audio output unit 185 to be low.

That is, the display device may control the intensity of the sound volume output by the audio output unit 185 in consideration of the noise level of the motor, generated while the front cover 105 moves up and down, and a closing degree of the first opening between the display 30 and the housing 10 and a closing degree of the second opening in the audio output unit 185 and the upper end and the lower end of the front cover 105, which change while the front cover 105 moves above and below the housing 10.

FIG. 19 is a flowchart for explaining a method of controlling a display device according to an embodiment of the present disclosure.

Referring to FIG. 19, in operation S1910, the display device may execute a mode for exposing a partial region or an entire region of a display area of a display to the outside. In this case, a state in which a partial region of the display area is exposed to the outside may be referred to as a line view or a partial view, and a state in which the entire region is exposed to the outside may be referred to as a full view. The display device may execute a line view (partial view) mode of controlling a cover or a display in a line view (partial view) state or a full view mode of controlling the cover or the display in a full view state. In this case, the display device may execute a mode based on a signal from a remote control device or may execute a mode through an interface unit embedded in the display device itself.

In operation S1902, the display of the display device may expose the partial region or the entire region of the display area to the outside upon receiving a signal in a state in which a display of the display device is accommodated in the housing. In this case, the display device may control the size of the display area exposed to the outside by moving the front cover or the display up and down using the motor.

In an embodiment of the present disclosure, the display device may move the display accommodated in the housing up and down to expose the partial region or the entire region of the display to the outside. The display device may expose the partial region or the entire region of the display to the outside by moving the front cover up and down in a state in which a display supported by the housing is fixed. When the front cover moves up and down, the display device may control the display to cover the partial region of the display by moving the front cover upward or expose the entire region of the display by moving the front cover downward in a state in which the display is fixed by the housing.

In operation S1930, the display device may control sound output through the audio output unit while moving the front cover or the display. In more detail, the display device may analyze at least one of a moving speed of the cover, a noise level of the motor, content that is currently output in the display area of the display, and a position change of the cover with respect to the audio output unit. This is the same as described above.

In operation S1940, the display device may control a level of sound output by the audio output unit based on a result analyzed through operation S1930. Likewise, in operation S1950, the display device may change a type of a sound source output by the audio output unit based on a result analyzed in operation S1930. Operations S1940 and S1950 may be performed simultaneously.

The embodiments described above with reference to FIGS. 1 to 18 may be implemented as a method of controlling a display device as shown in FIG. 19. That is, although FIGS. 1 to 18 describe that the display device (device) performs the control method for convenience of description, all embodiments may be implemented as the control method of the display device.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

Mode

Various embodiments of the present disclosure have been described in "Best Mode" which is the previous list, and it needs to appreciate by those skilled in the art to combine the embodiments described in the two or more drawings as needed to belong to the scope of the present disclosure.

INDUSTRIAL APPLICABILITY

The present disclosure is applicable to a display device of various form factors, and thus industrially applicable.

What is claimed is:
1. A display device comprising:
a display including a display area configured to output content;
an audio output unit configured to output sound;
a motor configured to control a cover to expose a partial region of the display area to an outside; and
a controller configured to:
control the display, the audio output unit, and the motor,
control a level of sound output by the audio output unit based on relative positions of the display and the cover while the motor controls the cover to expose the partial region of the display area to the outside,
control the cover from a first state in which an entire region of the display area is exposed to the outside to a second state in which the partial region of the display area is exposed to the outside, and
control the level of the sound output by the audio output unit to be high while converting the first state to the second state.

2. The display device of claim 1, wherein the controller controls the level of the sound output by the audio output unit to be low while converting the second state to the first state.

3. The display device of claim 1, wherein the controller further controls the level of the sound output by the audio output unit based on relative positions of the audio output unit and the cover while the motor controls the cover to expose the partial region of the display area to the outside.

4. The display device of claim 1, wherein the controller changes a type of a sound source output by the audio output unit based on content that is currently output in the display area while the motor controls the cover to expose the partial region of the display area to the outside.

5. The display device of claim 4, wherein the controller changes the type of the sound source based on a frequency of the sound source.

6. The display device of claim 1, wherein the controller further controls the level of the sound output by the audio output unit based on a moving speed of the cover while the motor controls the cover to expose the partial region of the display area to the outside.

7. The display device of claim 1, wherein the motor controls the display to expose the partial region of the display area, and
the controller further controls the level of the sound output by the audio output unit based on a moving speed of the display while the motor controls the display to expose the partial region of the display area.

8. The display device of claim 7, wherein the controller changes a type of a sound source output by the audio output unit based on content that is currently output in the display area while the motor controls the display to expose the partial region of the display area.

9. The display device of claim 7, wherein the controller controls the level of the sound output by the audio output unit based on noise generated from the motor while the motor controls the display to expose the partial region of the display area.

10. The display device of claim 1, further comprising a housing configured to support the cover and the display,
wherein the audio output unit is fixed to a preset region of the housing.

11. The display device of claim 1, wherein the cover includes at least one opening.

12. A method of controlling a display device in which a size of a display area exposed to an outside is changed, the method comprising:
controlling a cover to expose a partial region of the display area to an outside, by a motor included in the display device; and
controlling a level of sound output by an audio output unit based on a moving speed of the cover.

* * * * *